United States Patent
Hamada et al.

(10) Patent No.: US 7,740,742 B2
(45) Date of Patent: Jun. 22, 2010

(54) POWDER COMPOSITION FOR PAPER MANUFACTURING

(75) Inventors: Yoshihito Hamada, Wakayama (JP); Kazuo Kubota, Wakayama (JP); Atsushi Hiraishi, Wakayama (JP); Jun Kozuka, Wakayama (JP); Takahiro Kawaguchi, Wakayama (JP); Tsutomu Miyahara, Wakayama (JP); Hiroshi Noro, Wakayama (JP); Koichi Ohori, Wakayama (JP); Haruyuki Sato, Wakayama (JP)

(73) Assignee: Kao Corporation, Tokyo (JP)

( * ) Notice: Subject to any disclaimer, the term of this patent is extended or adjusted under 35 U.S.C. 154(b) by 524 days.

(21) Appl. No.: 10/560,582

(22) PCT Filed: Jul. 29, 2004

(86) PCT No.: PCT/JP2004/011216

§ 371 (c)(1),
(2), (4) Date: Dec. 13, 2005

(87) PCT Pub. No.: WO2005/012636

PCT Pub. Date: Feb. 10, 2005

(65) Prior Publication Data

US 2006/0137844 A1 Jun. 29, 2006

(30) Foreign Application Priority Data

Jul. 31, 2003 (JP) ............................ 2003-283404
Aug. 7, 2003 (JP) ............................ 2003-288439
Aug. 8, 2003 (JP) ............................ 2003-289811

(51) Int. Cl.
*D21H 17/24* (2006.01)
*D21H 17/33* (2006.01)
*D21H 17/44* (2006.01)
*D21H 21/22* (2006.01)

(52) U.S. Cl. ................ 162/164.6; 162/158; 162/164.1; 162/164.2; 162/168.1; 162/173; 162/185; 106/218; 106/219

(58) Field of Classification Search ................ 162/158, 162/164.1, 164.2, 164.6, 168.1, 173, 185; 106/218, 219
See application file for complete search history.

(56) References Cited

U.S. PATENT DOCUMENTS 2,341,302 A 2/1944 Wilson (Continued)

FOREIGN PATENT DOCUMENTS

EP 0 220 941 A1 5/1987

(Continued)

OTHER PUBLICATIONS

"Characteristics of raw starch", Nippon Starch Chemical Co., LTD., no date [retrieved on Jul. 13, 2008], Retrieved from the Internet: <URL: http://www.nichidene.com/Eng/kkh/b/b-2.htm.*

(Continued)

*Primary Examiner*—Steven P Griffin
*Assistant Examiner*—Dennis Cordray
(74) *Attorney, Agent, or Firm*—Birch, Stewart, Kolasch & Birch, LLP

(57) ABSTRACT

The powder composition for paper manufacturing of the invention contains a hydrophobic organic compound (A), an emulsifying and dispersing agent (B), and optionally water-soluble saccharides (C) added based on necessity and has an average particle diameter of 0.1 to 2,000 μm.

9 Claims, 1 Drawing Sheet

U.S. PATENT DOCUMENTS

| | | | |
|---|---|---|---|
| 2,401,090 A | | 5/1946 | Mashburn |
| 3,212,962 A | * | 10/1965 | Reynolds et al. ......... 162/168.1 |
| 5,116,924 A | * | 5/1992 | Bung et al. ................. 526/312 |
| 6,165,259 A | * | 12/2000 | Hallstrom et al. ........... 106/243 |
| 6,599,392 B1 | * | 7/2003 | Tadokoro et al. ............ 162/158 |
| 2002/0117278 A1 | * | 8/2002 | Ikeda et al. ................. 162/158 |
| 2003/0177943 A1 | * | 9/2003 | Auweter et al. ......... 106/31.28 |
| 2004/0171719 A1 | * | 9/2004 | Neivandt et al. .............. 524/47 |

FOREIGN PATENT DOCUMENTS

| | | | |
|---|---|---|---|
| EP | 0251132 A1 | * | 6/1987 |
| EP | 1 001 082 A1 | | 5/2000 |
| EP | 1 016 755 A2 | | 7/2000 |
| GB | 1 221 952 A | | 2/1971 |
| JP | 2971447 B1 | | 8/1999 |
| JP | 2002-115199 A | | 4/2002 |
| WO | WO-98/03730 A1 | | 1/1998 |
| WO | WO-98/33980 A1 | | 8/1998 |
| WO | WO-01/48024 A1 | * | 7/2001 |
| WO | WO 02/26892 | * | 4/2002 |

OTHER PUBLICATIONS

Smook, Handbook of Pulp and paper Technology, Angus Wilde Publications, 1990, p. 60.*

* cited by examiner

US 7,740,742 B2

POWDER COMPOSITION FOR PAPER MANUFACTURING

This application is a 371 of PCT/JP04/11216, filed Jul. 29, 2004 and claims priority to Japanese Application No. 2003283404, filed Jul. 31, 2003, Japanese Application No. 2003288439, filed Aug. 7, 2003 and Japanese Application No. 2003289811, filed Aug. 8, 2003.

FIELD OF THE INVENTION

The invention relates to a paper manufacturing composition to be used as a paper manufacturing additive, a production method of a pulp sheet using the composition, and a pulp sheet obtained by the above-mentioned production method.

BACKGROUND OF THE INVENTION

In terms of global environmental preservation, it has been required to save pulp consumption and accordingly, it has been required to make paper lightweight and increase the waste paper addition amount. However, the paper obtained simply with a decreased amount of pulp added has deteriorated opacity owing to the thinness of the paper, resulting in inferior quality.

Meanwhile, if the mixing ratio of waste paper is increased, the whiteness is deteriorated owing to the remaining ink in the waste paper pulp and the pulp itself is made thin during the recycling process to result in thin paper having a deteriorated opacity.

In order to prevent the decrease in thickness of paper due to it being lightweight, various methods for increasing the bulk and a method for using cross-linked pulp, a method for mixing synthetic fibers, a method for filling gaps among pulp fiber fillers such as an organic matter or the like, and a method for introducing voids have been known; however these methods are improper for recycling of pulp and deteriorate the smoothness of paper.

On the other hand, in order to improve the whiteness and opacity, a method of adding a large amount (e.g. 5 to 20% by weight) of an inorganic filler such as calcium carbonate, kaolin, white carbon or the like has been employed in this field. However, if a large amount of the inorganic filler is simply added, the weight of the paper is increased significantly and therefore, even if the pulp amount is saved and the inorganic filler is increased, the paper cannot be made lightweight. Particularly, in the case when inorganic filler is added to paper pulp, a large amount of the filler is required to be added and it makes the paper more difficult to be lightweight.

Recently, bulking agents for improving the bulky property of paper by adding an agent to the paper manufacturing process have been disclosed (JP-B 2971447, JP-A 2002-115199).

Conventionally, in a paper product production process, a variety of paper manufacturing chemical agents are added for improving the paper's qualities and its productivity, e.g. improving gloss, being water-proof, its sizing property, its toughness property and the like. These paper manufacturing chemical agents have solubility in water in a wide range.

In the case where agents having high solubility in water, they may be added in a form of an aqueous solution before the paper manufacturing process or applied as a solution to the surface of paper after manufacturing or are impregnated in the paper with the solutions to provide desired functions; however in the case where oil agents for the paper manufacturing have low solubility in water, it is difficult to evenly add or apply the agents if they are not dissolved once in solvents and that results in a problem such as recovery of the solvents.

Use of the oil agents for paper manufacturing having low solubility in water for paper manufacturing leads to technical difficulty of the paper manufacturing process and disadvantages in the process. On the other hand, by utilizing the low solubility of the oil agents for paper manufacturing in water, it has been tried to use the agents as paper quality improving agents. (JP-B 2971447, WO-A 98/03730)

EP-A 220941 discloses a granular solid composition containing a ketene dimer and a sealing agent.

SUMMARY OF THE INVENTION

The invention provides a powder composition for paper manufacturing containing a hydrophobic organic compound (A) to be used as a paper manufacturing agent and an emulsifying and dispersing agent (B) and having an average particle diameter of 0.1 to 2,000 µm, wherein the hydrophobic organic compound (A) is at least one compound selected from the following groups (i) to (viii), including their mixtures:

(i) organopolysiloxane compounds;

(ii) amine compounds;

(iii) amine acid salt compounds;

(iv) quaternary ammonium compounds;

(v) imidazole compounds;

(vi) hydrocarbon compounds;

(vii) alcohol compounds; and (viii) at least one compound having a carbonyl group and an alkyl group in a molecule, selected from the following groups (viii-a) to (viii-f), including their mixtures:

(viii-a) aliphatic acids or their addition products of alkylene oxide having 2 to 4 carbon atoms;

(viii-b) esters of aliphatic acids and alcohols or their addition products of alkylene oxide having 2 to 4 carbon atoms;

(viii-c) aliphatic acid amides or their addition products of alkylene oxide having 2 to 4 carbon atoms;

(viii-d) aliphatic acid amideamines or their addition products of alkylene oxide having 2 to 4 carbon atoms;

(viii-e) rosin; and (viii-f) alkenylsuccinic acids.

The invention also provides a method of producing a pulp sheet including adding the above-mentioned powder composition for paper manufacturing to a pulp slurry or adding a dispersion of the powder composition in water to the pulp slurry.

Further, the invention provides a bulking agent for paper containing an ester compound ($\alpha$), which is an ester compound of a polyhydric alcohol and fatty acid and having an esterification ratio of OH of the polyhydric alcohol per 1 mole in a range of 10 to 95% by equivalent, HLB 1 to 14, and a melting point 100° C. or lower and a copolymer ($\beta$) including a unit derived from at least one kind of a non-ionic monomer having a dissolution parameter of 20.5 $(MPa)^{1/2}$ or lower and a unit derived from at least one kind of cationic monomers, wherein the content of ($\alpha$) in the total of ($\alpha$) and ($\beta$) is 80 to 99.9% by weight.

The invention provides a bulking agent for paper containing an ester compound ($\alpha$), which is an ester compound of a polyhydric alcohol and fatty acid and having an esterification ratio of OH of the polyhydric alcohol per 1 mole in a range of 10 to 95% by equivalent, HLB 1 to 14, and a melting point 100° C. or lower and a copolymer (β) having units derived from at least one kind of a non-ionic monomer having a dissolution parameter of 20.5 (MPa)$^{1/2}$ or lower and at least one kind of cationic monomers, wherein the contents of (α) and (β) are 80 to 99.9% by weight for (α) and 0.1 to 20% by weight for (β).

The invention provides a production method of a pulp sheet including adding the above-mentioned bulking agent for paper to a pulp slurry.

The invention provides a paper manufacturing chemical agent particle containing an oil chemical agent for paper manufacturing in the form of oil droplets and enclosed in a water-soluble solid matrix in a dispersed state.

The invention provides a production method of the paper manufacturing chemical agent particle including dissolving a water-soluble solid matrix forming agent in water at a temperature equal to or higher than the melting point of an oil chemical agent for paper manufacturing; optionally adding the oil chemical agent for paper manufacturing and an emulsifying substance if necessary; emulsifying the oil chemical agent for paper manufacturing for obtaining an emulsion; and drying the emulsion at a temperature equal to or higher than the melting point of the oil chemical agent for paper manufacturing.

The invention of the above shown powder composition may be used as a paper manufacturing additive.

DETAILED DESCRIPTION OF THE INVENTION

Figure 1:
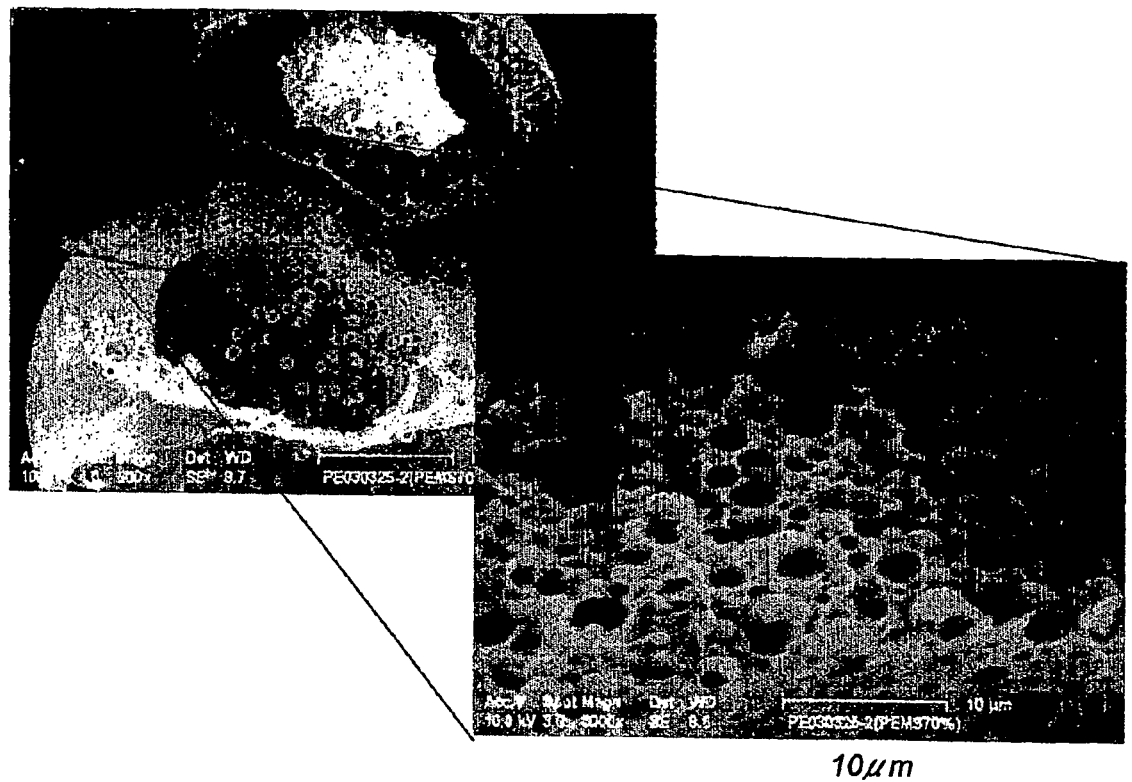
FIG. 1 is a cross sectional view of powder obtained in Example 3 by a scanning electron microscopic photograph or cross-sectional view of the paper manufacturing chemical agent particle obtained in Example 24.

With respect to JP-B 2971447 and JP-A 2002-115199, a bulking agent with good workability and high efficiency has been desired. Further, a rosin sizing agent as an interpolating type sizing agent and alkenylsuccinic acid anhydride type sizing agent have the solid component concentration about 20% by weight or even in the case of a solid, a heating and dissolving step or an emulsifying step is required and therefore, it has been desired to increase the concentration and improve the workability.

These additives for paper manufacturing are hydrophobic organic compounds, and include such as oil chemical agents for paper manufacturing.

In the case where an oil chemical agent for paper manufacturing is used for a paper manufacturing process, it has been known that the agent is added in the form of a water-based emulsion after the oil droplet diameter is adjusted by emulsification. For example, in the case of an oil chemical agent for paper manufacturing in a solid phase at a room temperature (20 to 25° C.), in order to adjust the oil droplet diameter, the agent is once heated to the melting point or higher and then formed into an emulsion. However, in a practical paper manufacturing case, since a large quantity of water is used and the process is carried out generally at a room temperature (20 to 25° C.), the agent is cooled in some step and the agent's physical state tends easily change from the liquid phase to the solid phase and therefore becomes instable. Therefore, the agent becomes agglomerates with 300 μm or larger size in the cooling step and sedimentation and flotation of the agent are cased in the chemical agent solution to result in processing problems and in addition to that, a problem of the quality such as oil spot formation or the like may be caused in some cases. Accordingly, in such a case, it is required to carry out the cooling step and at the same time to suppress the agglomeration by employing a quenching method or the like, wherein the installation cost is further increased.

The invention provides a powder composition for paper manufacturing exhibiting preferably efficiency equal to or higher than that of a conventional paper manufacturing additive, therefore improving the workability, a pulp sheet production method using the composition, and a pulp sheet obtained by the production method.

The invention also provides a bulking agent for paper exhibiting efficiency preferably equal to or higher than that of a conventional paper manufacturing additive, therefore improving the workability, a pulp sheet production method using the bulking agent for paper, and a pulp sheet obtained by the production method.

In a paper manufacturing process, the following problems exist: in the case of adding an oil chemical agent for paper manufacturing having a low solubility in water and therefore difficult to handle in the form of an aqueous solution, if an addition method requires a solvent, a solvent recovery facility is needed: if a method requires emulsification at the time of the agent addition, emulsification facilities are required for the respective paper manufacturing facilities: and in the case of preserving the agent in the form of a water-based emulsion, a large storage space is required owing to the low content of the efficacious agent.

The invention provides a paper-manufacturing chemical agent particle which may be used by adding/stirring it in cold water in the case of adding an oil chemical agent for paper manufacturing having low solubility in water and difficult to handle in the form of an aqueous solution, and a production method of the agent particle.

An emulsifying substance in the invention means a substance having a function of emulsifying the oil chemical agent for paper manufacturing in water.

Use of the powder composition for paper manufacturing of the invention makes it possible to improve the paper properties such as the bulking property and sizing property without requiring a preliminary step of heating and dissolution or emulsification.

The bulking agent for paper of the present invention preferably gives more efficient bulking effect than a conventional bulking agent for paper and gives a pulp sheet with improved bulking property, whiteness and opacity while using a less amount of the agent.

The paper manufacturing chemical agent of the present invention preferably has good dispersibility in water at a room temperature (20 to 25° C.) although it contains the oil chemical agent for paper manufacturing having low solubility in water, and it does not require operation of heating or quenching. Further, in the case of using the paper manufacturing chemical agent particle of the invention, good effects of the agent can be provided in paper manufacturing.

<(A) Component>

The hydrophobic organic compound of the (A) component works as a paper quality improving agent for achieving the effects of the invention and may include an interpolating sizing agent or defoaming agent and is particularly useful as a bulking agent. The term, "bulking agent" in the invention means a component having a function of increasing the bulky-ness (decreasing the density) of the paper, possibly without deteriorating the various characteristics required for paper. For example, bulking agent shown in Examples.

The oil chemical agent for paper manufacturing is the (A) component in the first invention and may include those having low solubility in water and is difficult to dissolve in water, and which is added in the paper manufacturing process and usable as bulking agents.

Examples of the oil chemical agent for paper manufacturing are those which do not become evenly transparent in the case they are added and stirred in water in a concentration of 1% by weight (may be heated to 100° C. or less in the middle of the process) and kept at 20° C.

Examples of the hydrophobic organic compound of the (A) component are compounds which can lower the density of paper by adding 1.0% by weight to pulp by 0.02 or more, particularly preferably 0.03 or more, and furthermore preferably 0.05 or more, than that of paper containing no such compound.

As the (A) component or the hydrophobic organic compound of the oil chemical agent for paper manufacturing, at least one compound or compound (α) selected from the following groups (i) to (viii), including mixtures thereof, is preferable and those in a solid state at 20° C. are preferable in terms of sizing capability. The solid state includes in the state of the compound at the melting point or lower, or in the state the compound has no fluidity or considerable decreased fluidity even if it is at a temperature exceeding the melting point.

Preferable examples of the hydrophobic organic compound of (A) are those which do not become evenly transparent in the case they are added and stirred in water in a concentration of 1.0% by weight (may be heated to 100° C. in the middle of the process) and kept at 20° C.

Here, the phrase "those which do not become evenly transparent" means that the entire system does not become even (the state that no precipitate or floating matter exists) or that even if the system is even, the transmittance (T %) of an aqueous solution of 1.0% by weight of the (A) component relative to 100% for water is 5% or lower at 20° C. in an optical path 10 mm with visible light wavelength of 660 nm.

(i) Organopolysiloxane Compounds

Examples of the organopolysiloxane compounds may include methylpolysiloxane with a viscosity at 25° C. of 10 to 1,000,000 mPa·s, polyoxyethylene methylpolysiloxane copolymers with HLB of 1 to 14 by Griffin's method, and poly(oxyethylene-oxypropylene)methylpolysiloxane copolymers with an HLB of 1 to 14.

(ii) Amine compounds, (iii) amine acid salt compounds, (iv) quaternary ammonium compounds, (v) imidazole compounds and compounds defined by the following general formulas (b) to (j) are exemplified below. The amine acid salt compounds may include ionized or un-ionized compounds.

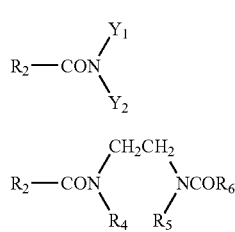

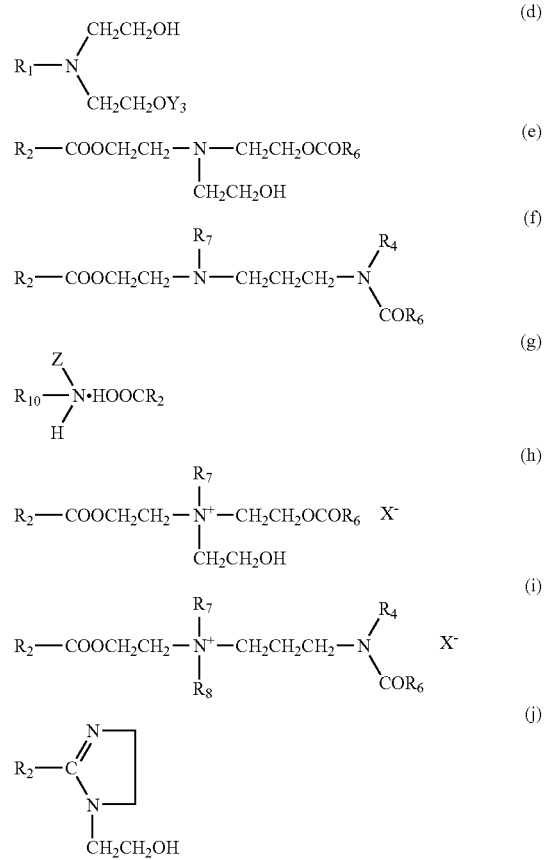

[In the formula, $Y_1$ and $Y_2$ may be the same as or different from each other and independently denote hydrogen; $R_4$, $R_6CO$—, -$(AO)_n$—$COR_3$, or -$(AO)_n$—H; AO denotes an alkylene oxide having 2 to 4 carbon atoms; and $Y_3$ denotes hydrogen or —$COR_6$;

Z denotes —$CH_2CH_2O(AO)_n$—$OCOR_9$ or —$CH_2CH(OH)$—$CH_2OCOR_9$;

$R_1$ denotes an alkyl, alkenyl, or β-hydroxyalkyl group having 8 to 35 carbon atoms;

$R_2$, $R_3$, $R_6$, and $R_9$ independently denote an alkyl, alkenyl, or β-hydroxyalkyl group having 7 to 35 carbon atoms;

$R_4$ and $R_5$ independently denote hydrogen or an alkyl having 1 to 3 carbon atoms;

$R_7$ and $R_8$ independently denote an alkyl having 1 to 3 carbon atoms;

$R_{10}$ denotes hydrogen or $R_9$;

n denotes an average mole number in 1 to 20; and $X^-$ denotes an anion]

(vi) Hydrocarbon Compounds

Waxes, paraffins, and polyethylenes can be exemplified.

(vii) Alcohol Compounds

Straight chain or branched monohydric alcohols, polyhydric alcohols or their addition products of alkylene oxide having 2 to 4 carbon atoms. Further, ether compounds obtained by addition of an alkylene group to a portion or all of the terminals of the alcohols can be exemplified.

As the polyhydric alcohols, di to tetradecahydric alcohols having 2 to 24 carbon atoms in total and optionally containing ether groups are preferable and di to octahydric alcohols are more preferable and tri to hexahydric alcohols are more particularly preferable.

As the dihydric alcohols, alcohols having 2 to 10 carbon atoms in total and optionally containing ether groups such as propylene glycol, dipropylene glycol, butylene glycol, dibutylene glycol, ethylene glycol, diethylene glycol, and polyethylene glycol can be exemplified.

As the trihydric alcohols, alcohols having 3 to 24 carbon atoms in total and optionally containing ether groups and having a ratio of (the total hydroxyl groups)/(carbon atoms) in a molecule in a range of 0.4 to 1 can be exemplified, and practical examples are glycerin, polyglycerin (the average condensation degree of 2 to 5), pentaerythritol, dipentaerythritol, arabitol, sorbitol, stachyose, erythritol, arabitol, mannitol, glucose, and sucrose.

Ethylene glycol, diethylene glycol, propylene glycol, and tri or higher hydric alcohols having 3 to 12 carbon atoms in total and optionally containing ether groups and having a ratio of (the total hydroxyl groups)/(carbon atoms) in a molecule in a range of 0.5 to 1 are more preferable. Glycerin, polyglycerin, (the average condensation degree of 2 to 4), and pentaerythritol are even more preferable.

(viii) At Least One Compound Having a Carbonyl Group and an Alkyl Group in a Molecule and Selected from the Following Groups (viii-a) to (viii-f)

Examples of the above-mentioned compound are (viii-a) aliphatic acids or their addition products of alkylene oxide having 2 to 4 carbon atoms;

(viii-b) esters of aliphatic acids and alcohols or their addition products of alkylene oxide having 2 to 4 carbon atoms;

(viii-c) aliphatic acid amides or their addition products of alkylene oxide having 2 to 4 carbon atoms;

(viii-d) aliphatic acid amideamines or their addition products of alkylene oxide having 2 to 4 carbon atoms;

(viii-e) rosin; and (viii-f) alkenylsuccinic acids.

Among them, fatty acids and esters of fatty acids and alcohols are preferable.

Examples of the fatty acids are those having 1 to 24 carbon atoms, preferably 10 to 22 carbon atoms and saturated, unsaturated, straight chain, or branched fatty acids may be included. Straight chain fatty acids are particularly preferable. Lauric acid, myristic acid, palmitic acid, stearic acid, behenic acid, and oleic acid are more particularly preferable and stearic acid is furthermore preferable.

The above-mentioned fatty acids can be exemplified for those to be used for the esters of fatty acids and alcohols and practical examples of the alcohols are those exemplified for (vii) alcohol compounds.

These esters can be obtained by known esterification reactions and alkylene oxide addition reactions. For example, esters can be obtained by adding an esterification catalyst to a mixture of a fatty acid and a polyhydric alcohol and carrying out the reaction at 150 to 250° C. and further alkylene oxide-added esters can be obtained by adding an alkylene oxide having 2 to 4 carbon atoms in the presence of an alkali catalyst. Or, after the alkylene oxide addition to a fatty acid or a polyhydric acid, esterification may be carried out. Further, in some cases, such an ester can be obtained by carrying out only alkylene oxide addition to a fatty acid.

The average ester substitution degree of the esters is in a range of 10 to 95% by equivalent of OH in the alcohol per 1 mole polyhydric alcohol and those having 1 to 2 mole ester groups per 1 mole polyhydric alcohol are more preferable.

In the case of alkylene oxide-added esters, the number of the average addition moles of alkylene oxide (AO) is preferably not less than 0 and lower than 12 mole per 1 mole ester and more preferably 0.1 to 6 mole. In the case of using polyalcohols to be AO groups such as ethylene glycol, the number of the AO groups of them should be included. As the alkylene oxides, ethylene oxide (EO) and propylene oxide (PO) are preferable. The EO and PO may be used alone or in form of a mixture of EO and PO. In the invention, esters of polyhydric acids having no AO group and fatty acids are more preferable.

Particularly, ester compounds of alcohols selected from glycerin, polyglycerin (average condensation degree 2 to 4), and pentaerythritol, and stearic acid are preferable and more particularly, an ester compound ($\alpha$) defined as follows is preferable as the ester compounds.

The ester compound ($\alpha$) is an ester compound of a polyhydric alcohol and a fatty acid and having an esterification ratio of OH of the polyhydric alcohol per 1 mole in a range of 10 to 95% by equivalent, HLB 1 to 14, and a melting point 100° C. or lower. At least two of such ester compounds ($\alpha$) may be used.

The polyhydric alcohol composing the ester compound ($\alpha$) is preferably bi to tetradecahydric alcohols having 2 to 24 carbon atoms in total and optionally containing ether groups.

Dihydric alcohols are those having 2 to 10 carbon atoms in total and optionally containing ether groups and practical examples are propylene glycol, dipropylene glycol, butylene glycol, dibutylene glycol, ethylene glycol, diethylene glycol, and polyethylene glycol and the like.

Tri or higher hydric alcohols are those having 3 to 24 carbon atoms in total and optionally containing ether groups and a ratio of (the total OH groups in one molecule)/(total carbon atoms) in a range of 0.4 to 1 and practical examples are glycerin, polyglycerin (n=2 to 5), pentaerythritol, dipentaerythritol, arabitol, sorbitol, stachyose, erythritol, arabitol, mannitol, glucose, and sucrose and the like.

Polyhydric alcohols are ethylene glycol, diethylene glycol, propylene glycol and tri or higher alcohols having 3 to 12 carbon atoms in total and optionally containing ether groups and a ratio of (the total OH groups in one molecule)/(total carbon atoms) in a range of 0.5 to 1 and further preferable examples are glycerin and polyglycerin (n=2 to 4), and pentaerythritol.

The fatty acid composing the ester compound ($\alpha$) may include fatty acids having 1 to 24 carbon atoms, preferably 10 to 22 carbon atoms and saturated, unsaturated, straight chain or branched chain fatty acids may be included and straight chain fatty acids are particularly preferable. Lauric acid, stearic acid, palmitic acid, oleic acid, myristic acid, and behenic acid are more particularly preferable.

The ester compound ($\alpha$) may be obtained by a conventionally known esterification reaction and alkylene oxide addition reaction.

For example, the ester compound can be obtained by adding an esterification catalyst to a mixture of a fatty acid and a polyhydric alcohol according to its needs, and carrying out the reaction at 150 to 250° C. and the alkylene oxide addition product can be obtained by further adding an alkylene oxide in the presence of the alkali catalyst. Or, after alkylene oxide to the fatty acid or to the polyhydric alcohol, esterification may be carried out. Further, in some cases, the addition product can be obtained by adding alkylene oxide to the fatty acid.

The average esterification substitution degree of the ester compound (α) is preferably 10 to 95% by equivalent esterification of OH groups of the alcohol per 1 mole of the polyhydric alcohol and those having 1 to 2 mole fatty acid groups per 1 mole of the polyhydric alcohol are more preferable.

In the case of using those containing alkylene oxide groups (OA groups) having 2 to 4 carbon atoms as the ester compound (α), the number of the groups is preferably not less than 0 and less than 12 mole on the basis of the average per 1 mole of the ester compound (α) and more preferably not higher than 6 mole, even more preferably 0.1 to 6 mole. In the case of using a polyhydric alcohol to be OA groups such as ethylene glycol, these OA groups may be included into the number. OA groups may be formed by adding alkylene oxides having 2 to 4 carbons.

As alkylene oxides, ethylene oxide (EO) and propylene oxide (PO) are preferable. They may be EO, PO or a mixture of EO and PO. In the invention, the ester compound (α) containing no OA group is particularly preferable to be used as a bulking agent for paper.

The ester compound (α) has an HLB in a range of 1 to 14, preferably 1.5 to 10, more preferably 2 to 8, even more preferably 2 to 7, and even more preferably 2.5 to 7. HLB is a scale of the hydrophilicity of the surfactant and as the value is higher, the hydrophilicity is higher. In the invention, HLB of each compound is calculated based on the following equation according to Griffin's method.

$$HLB = \frac{\text{Molecular weight of hydrophilic group portion}}{\text{Molecular weight of the ester compound}} \times 20$$

The hydrophilic group in the invention means the following groups in the ester compound.

(1) —$(CH_2CH_2O)_m$—

(2) —$(RO)_n$— [R: alkylene group having 3 to 4 carbon atoms; n<2.0 (n is the total in one molecule)]

For example, the underlined portion of RCOO—$\underline{(PO)_{1.5}H}$ is the hydrophilic group.

However, the underlined portion of RCOO—$\underline{(PO)_{2.0}H}$ is the hydrophobic group.

Further, since PO groups exist in an amount of 2 mole in total in a molecule of

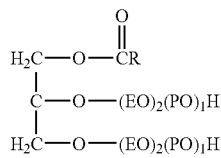

PO groups are hydrophobic groups.

(3) Groups derived from tri or higher hydric alcohols having 3 to 24 carbon atoms and optionally containing ether groups and having the ratio of (total OH groups)/(total carbon atoms) in one molecule in a range of 0.4 to 1.

(4) Oxygen Atom Neighboring to Carbonyl Group.

The ester compound (α) has a melting point of 100° C. or lower, preferably −15 to 80° C., more preferably 10 to 70° C., even more preferably 20 to 70° C., and even more preferably 45 to 70° C. in terms of the handling property and size maintaining function. The melting point is defined to be the temperature when the curve of the absorbed calorie begins to rise, when ester compound (α) which is pre-cooled and solidified is measured (temperature raising ratio 2° C./min) by a differential scanning calorimeter (DSC).

Compounds satisfying both HLB and the melting point as the ester compound (α) are preferable to have HLB in a range of 2 to 8 and a melting point in a range of 10 to 70° C. and more preferably HLB in a range of 2 to 7 and a melting point in a range of 45 to 70° C. The compounds having HLB and a melting point in these ranges give preferable results in the bulking effect and the sizing effect (maintaining the effect of the sizing agent).

<(B) Component>

The emulsifying and dispersing agent, the (B) component, is for emulsifying and dispersing the hydrophobic organic compound, the (A) component.

The emulsifying and dispersing agent of the (B) component is a compound different from the (A) component and examples are cationic group-containing polymer compounds; alcohol type, fatty acid type or ester type nonionic surfactants; carboxylic acid type, sulfonic acid type, sulfuric acid ester type, and phosphoric acid ester type anionic surfactants; cationic surfactants such as quaternary ammonium salts; and amphoteric surfactants such as amino acids and betaine. Among them, at least one compound selected from the cationic group-containing polymer compounds, including mixtures, is preferable and more particularly, cationic group-containing natural polymer compounds and polymers containing a nonionic monomer unit and a cationic monomer unit are preferable. The weight average molecular weight of the polymer compounds is preferably 10,000.

As the cationic group-containing natural polymer compounds, cationic (amphoteric) starch, cationic (amphoteric) cellulose, cationic (amphoteric) poval, cationic (amphoteric) gum can be exemplified. Among them, cationic (amphoteric) starch is preferable.

The starch of the cationic (amphoteric) starch may include, for example, natural starch such as corn starch, potato starch, wheat starch, and tapioca starch and denatured starch. The denatured starch is processed starch obtained by physical and/or chemical treatment of starch as described in "Dictionary of Paper and Processing Chemicals" Tech Times, p.p. 36-37 (1991) and oxidized starch obtained by treating starch with an oxidizing agent such as sodium hypochlorite and periodate and cationic starch obtained by introducing cationic groups such as 3-chloro-2-hydroxypropyltrimethylammonium chloride, glycidyltrimethylammonium chloride, or diethylaminoethyl chloride hydrochloric acid salt into the molecule of starch are preferable. As described in "Dictionary of Paper and Processing Chemicals" Tech Times, p. 283, the denatured starch obtained by further introducing a phosphoric acid group into the above-mentioned cationic starch is sometimes called as amphoteric starch and in the invention, such amphoteric starch is included as a cationic starch.

The substitution degree of the cation of the cationic (amphoteric) starch is preferably 0.005 to 0.1 and more preferably 0.01 to 0.08. Incidentally, the substitution degree of the cation of the cationic (amphoteric) starch means the average value of the number of the hydroxyl groups into which cationic groups are introduced among the total hydroxyl groups existing in one molecule of glucose residue composing the cationic (amphoteric) starch and in the case the introduction is carried out into all of the hydroxyl groups, the substitution degree is 3.

As the polymer containing the nonionic monomer unit and the cationic monomer unit, polymers containing nonionic unsaturated monomers and unsaturated cationic monomers are preferable. Particularly, the following copolymer (β) defined as follows is preferable.

The copolymer (β) containing units derived from at least one kind of non-ionic monomers having a dissolution parameter of 20.5 (MPa)$^{1/2}$ or lower and at least one kind of cationic monomers. At least two of such copolymers (β) may be used in combination. The copolymer (β) which can emulsify and disperse the ester compound (α) is preferred.

Examples of the nonionic unsaturated monomer may include (meth) acrylic acid esters with alkyl having 1 to 40 carbon atoms, preferably 2 to 24 carbon atoms; vinyl alcohol esters with alkyl acid having 1 to 40 carbon atoms, preferably 2 to 24 carbon atoms; (meth) acrylamide modified with alkyl having 2 to 40 carbon atoms, preferably 3 to 24 carbon atoms; (meth) acrylamide modified with an alkoxy group having 2 to 40 carbon atoms, preferably 3 to 24 carbon atoms; maleic acid ester with a mono or dialkyl having 1 to 40 carbon atoms; fumalic acid ester with a mono or dialkyl having 1 to 40 carbon atoms; styrene, vinyltoluene, α-methylstyrene, ethylene, propylene, butadiene, polyalkylene glycol(meth)acrylate, alkoxypolyalkylene glycol (meth)acrylate, polyalkylene glycol alkenyl ether, and alkoxypolyalkylene glycol alkenyl ether. Among them, (meth)acrylic acid ester with alkyl having 2 to 24 carbon atoms is preferable.

As for the dissolution parameter (δ), the values are described in POLYMER HANDBOOK (J. Brandrup and E. H. Immergut, third edition). In the case the structure is not directly described, the value calculated based on the following equation described in VII/519 of the above-mentioned document may be employed.

$$\delta=[(H-R\times298.15)/V]^{1/2} \text{ [unit: } (cal/m^3)^{1/2} \text{ or } \times2.046 \text{ (MPa)}^{1/2}]$$

H: denotes evaporation enthalpy [unit: (cal/mol) or (×4.186 J/mol];

R: denotes gas constant [unit: (1.98719 cal/K·mol) or (1.98719×4.186 J/K·mol)];

V: denotes mol volume (cm$^3$/mol);

Incidentally, in the invention, H (evaporation enthalpy) in the above-mentioned equation can be calculated from a standard boiling point $T_b$ on the basis of the experimentally deduced equation:

$$H=-2950+23.7T_b+0.020T_b^2 \text{ [unit: (cal/mol) or } (\times4.186 \text{ J/mol]}$$

As the standard boiling point $T_b$, the value described in Aldrich's (2000-2001; Japan) reagent catalog is employed and in the case the boiling point under reduced pressure is described, the boiling point under a normal pressure is calculated from the pressure-temperature calculation table attached to the catalog. With respect to a monomer which is not described in the catalog or a monomer of which the boiling point is not described, using the Group Contribution method, the dissolution parameter (δ) at 25° C. is calculated from the following equation.

$$\delta=\Sigma Fi/V$$

F: mole suction constant [unit: (cal/m$^3$)$^{1/2}$ cm$^3$/mol or ×2.046 (MPa)$^{1/2}$ cm$^3$/mol]

Incidentally, in the invention, the calculation is carried out by using a Hoy value for F. A calculation example of the dissolution parameter (δ) of the monomer is as follows.

Calculation Example 1

The calculation example of the dissolution parameter (δ) of the monomer monomer: lauryl acrylate (molecular weight: 254.42, Tb: 301° C., the specific gravity; 0.86)

$H=-2950+23.7\times574.16+0.020\times(574.16)^2=17250.8$ $V=254.42/0.868=293.1$ $\delta=[(H-1.98719\times298.15)/V]_{1/2}=7.5 \text{ (cal/m}^3)^{1/2}=15.4 \text{ (MPa)}^{1/2}$ A non-ionic monomer having the dissolution parameter of 20.5 (MPa)$^{1/2}$ or lower to be used for the polymerization of the copolymer (β) is a monomer which does not bear anionic or cationic polarity following the pH alteration, and a cationic monomer includes not only a monomer bearing cationic polarity but also a monomer to be cationic by pH alteration.

The dissolution parameter of the nonionic monomer to be used for the polymerization of the copolymer (β) is preferably 20.5 (MPa)$^{1/2}$ or lower, more preferably 18.0 (MPa)$^{1/2}$ or lower, furthermore preferably 16.5 (MPa)$^{1/2}$ or lower, and even more preferably 15.5 (MPa)$^{1/2}$ or lower.

As the nonionic monomer with a dissolution parameter of 20.5 (MPa)$^{1/2}$ or lower, unsaturated monomers are preferable and examples are (meth)acrylic acid esters with an alkyl having 1 to 40 carbon atoms, preferably 2 to 24 carbon atoms; fatty acid esters with an alkenyl (preferably ester with vinyl) having 1 to 40 carbon atoms, preferably 2 to 24 carbon atoms; (meth)acrylamide modified with an alkyl having 2 to 40 carbon atoms, preferably 3 to 24 carbon atoms; (meth)acrylamide modified with an alkoxy group having 2 to 40 carbon atoms, preferably 3 to 24 carbon atoms; maleic acid ester with a mono or dialkyl having 1 to 40 carbon atoms; fumalic acid ester with a mono or dialkyl having 1 to 40 carbon-atoms; styrene, vinyltoluene, α-methylstyrene, ethylene, propylene, butadiene, polyalkylene glycol (meth) acrylate, alkoxypolyalkylene glycol (meth)acrylate, polyalkylene glycol alkenyl ether, and alkoxypolyalkylene glycol alkenyl ether.

As the cationic monomer, unsaturated monomers are preferable.

Preferable examples of the unsaturated monomers are dimethylaminoethyl (meth)acrylate, diethylaminoethyl (meth) acrylate, dimethylaminopropyl (meth)acrylamide, diethylaminopropyl (meth)acrylamide, allylamine, diallylamine, and triallylamine.

Unsaturated monomer salts are more preferable and salts of inorganic acids or organic acids such as hydrochloric acid, sulfuric acid, acetic acid, and phosphoric acid are more preferable.

Further, quaternary ammonium salts obtained by reaction of the unsaturated monomers and quaternization agents are preferable and more preferable examples are quaternary ammonium salts of methyl halide (chloride, bromide and the like), ethyl halide (chloride, bromide and the like), benzyl halide (chloride, bromide and the like), dialkyl (methyl, ethyl and the like) sulfate, dialkyl (methyl, ethyl, and the like) carbonate, and epichlorohydrin.

In addition, dimethylaminoethyl (meth)acrylate, diethylaminoethyl (meth)acrylate, dimethylaminopropyl (meth) acrylamide, diethylaminopropyl (meth)acrylamide, allylamine, diallylamine, and triallylamine may be used after treatment with an inorganic acid such as hydrochloric acid, sulfuric acid, acetic acid, phosphoric acid, and organic acid salts after copolymerization.

Among them, a quaternary ammonium salt obtained by reaction of dimethylaminoethyl (meth)acrylate with a quaternization agent is preferred.

The polymerization method of the non-ionic monomer and the cationic monomer is not particularly limited and for example, conventionally known polymerization methods such as solution polymerization and bulk polymerization using a polymerization initiator can be employed. The polymerization method can be carried out in both a batch manner and a continuous manner.

The amount of the nonionic monomer used is preferably 0.3 to 84% by mole, more preferably 0.5 to 70% by mole, even more preferably 0.5 to 60% by mole, and even more preferably 0.5 to 50% by mole. The amount of the cationic monomer used is preferably 5 to 99.7% by mole, more preferably 30 to 99.5% by mole, even more preferably 40 to 99.5% by mole, and even more preferably 50 to 99.5% by mole.

As another monomer, cross-linking monomers may be used in combination.

For the polymerization of the copolymer (β), together with the above-mentioned nonionic monomer and cationic monomer with dissolution parameter of 20.5 $(MPa)^{1/2}$ or lower, monomers not belonging to the foregoing monomers can be used. The ratios of these monomers may be preferably 0 to 50% by mole, more preferably 0 to 30% by mole, and even more preferably 0 to 10% by mole. Further crosslinking monomers may be used based on necessity. The crosslinking monomers may belong to or not to the foregoing monomers.

Since the cross-linking degree greatly depends on the mole ratio, the ratio of a crosslinking agent to be used in combination is preferably 0.001 to 5% by mole, more preferably 0.01 to 1% by mole, and even more preferably 0.05 to 0.5% by mole.

Examples of the crosslinking monomers are bifunctional crosslinking monomers such as methylene bis(meth)acrylamide, ethylene bis(meth)acrylamide, hexamethylene bis(meth)acrylamide, ethylene glycol di(meth)acrylate, diethylene glycol di(meth)acrylate, triethylene glycol di(meth)acrylate, polyethylene glycol di(meth)acrylate, divinylbenzene, diallyl (meth)acrylamide; and polyfunctional crosslinking monomers such as 1,3,5-triacryloyl-hexahydro-s-triazine, triallyl isocyanurate, pentaerythritol triacrylate, trimethylol propaneacrylate, triacrylformal, and diacryloyl imide.

In the case the copolymer (β) containing the above-mentioned nonionic monomer-unit with dissolution parameter of 20.5 $(MPa)^{1/2}$ or lower and cationic monomer unit, the ratios of the respective monomer units (on the basis of raw materials) are as follows.

The ratio of the nonionic monomer unit with a dissolution parameter of 20.5 $(MPa)^{1/2}$ or lower in the total of the nonionic monomer and cationic monomer units is preferably 0.5 to 50% by mole, more preferably 5 to 50% by mole, more preferably 7 to 40% by mole, and even more preferably 10 to 30% by mole. This ratio is preferred when the nonionic monomer is (meth)acrylate with an alkyl group having 12 carbon atoms.

When the nonionic monomer is (meth) acrylate with an alkyl group having 16 to 24 carbon atoms, the ratio of the nonionic monomer unit with a dissolution parameter of 20.5 $(MPa)^{1/2}$ or lower in the total of the nonionic monomer and cationic monomer units is preferably 0.5 to 50% by mole, more preferably 0.5 to 25% by mole, more preferably 1 to 10% by mole, and even more preferably 2 to 5% by mole.

The ratio of the cationic monomer unit in the total of the nonionic monomer and cationic monomer units is preferably 50 to 95.5% by mole, more preferably 50 to 95% by mole, more preferably 60 to 93% by mole, and even more preferably 70 to 90% by mole. This ratio is preferred when the nonionic monomer is (meth)acrylate with an alkyl group having 12 carbon atoms.

When the nonionic monomer is (meth) acrylate with an alkyl group having 16 to 24 carbon atoms, the ratio of the cationic monomer unit in the total of the nonionic monomer and cationic monomer units is preferably 50 to 95.5% by mole, more preferably 75 to 95.5% by mole, more preferably 90 to 99% by mole, and even more preferably 95 to 98% by mole.

The copolymer (β) has a weight average molecular weight of preferably 1,000 to 1,000,000, more preferably 5,000 to 5,000,000, and even more preferably 10,000 and 2,000,000 in terms of the dispersing ability to the ester compound (α).

The weight average molecular weight is measured by GPC under the following conditions. Polyethylene glycol (standardized samples for GPC) is used for the basis of the molecular weights.

[Measurement Conditions]

Column: α-M×2 (Tosoh Corporation)

Elution solution: 50 mM LiBr, 1% acetic acid/ethanol=70/30 (volume ratio)

Flow rate: 0.6 mL/min.

Column temperature: 40° C.

Detector: RI

Sample concentration: 2 mg/mL

Injection amount: 100 μL

Any known solvent to be used at the time of the polymerization based on_necessity may be used without any particular limit, and examples of the solvent are water; alcohols such as methyl alcohol (methanol), ethyl alcohol (ethanol), and isopropyl alcohol (isopropanol); aromatic or aliphatic hydrocarbons such as benzene, toluene, xylene, cyclohexane, and n-heptane; esters such as ethyl acetate; and ketones such as acetone and methyl ethyl ketone. Particularly, in terms of the solubility of a monomer mixture and the obtained copolymer, water and at least one alcohol selected from lower alcohols having 1 to 4 carbon atoms are preferably used.

As a polymerization initiator, persulfates such as ammonium persulfate, sodium persulfate, and potassium persulfate; azo compounds such as azobis-2-methylpropioneamidine hydrochloric acid salt, azoisobutyronitrile, and 2,2'-azobis(2, 4-dimethylvaleronitrile); and peroxides such as benzoyl peroxide, lauroyl peroxide, cumene hydroperoxide and one or more of them can be used. In such a case, as a promoter, one or more reducing agents such as sodium hydrogen sulfite, sodium sulfite, Mohr's salt, sodium hydrogen pyrosulfite, formaldehyde sodium sulfoxylate, and ascorbic acid: and amine compounds such as ethylenediamine, sodium ethylenediamine tetraacetate, glycine and the like can be used.

A chain transfer agent may be used based on_necessity. As the chain transfer agent, conventionally known agents may be used without any particular limit and examples are mercaptoethanol, mercaptoglycerin, mercaptosuccinic acid, mercaptopropionic acid, 2-ethylhexyl mercaptopropionate, 2-mercaptoethyl octanoate, 1,8-dimercapto-3,6-dioxaneoctane, decanetrithiol, dodecylmercaptane, hexadecanethiol, decanethiol, tetrachloromethane, tetrabromomethane, α-methylstyrene dimer, terpinolene, α-terpinene, γ-terpinene, dipentene, 2-aminopropane-1-ol and one or more of them can be used in combination.

The polymerization temperature is properly determined depending on the polymerization method, the solvent, the polymerization initiator, and the chain transfer agent to be employed and in general is preferably in the range of 0 to 150° C.

The polymerization temperature may be determined, depending on the polymerization method, the solvent, the polymerization initiator and the kind of the chain transfer agent to be employed. In general it is preferably in the range of 0 to 150° C. On completion of the polymerization reaction, a refining treatment such as vacuum drying, pulverization and the like may be carried out.

As the nonionic surfactant to be used as the (B) component, alcohol type, fatty acid type, and ester type surfactants can be exemplified and those obtained by adding alkylene oxide having 2 to 4 carbon atoms to alcohols, fatty acids, and esters having 8 to 24 carbon atoms can be used.

As the anionic surfactant to be used as the (B) component, carboxylic acid type, sulfonic acid type, sulfuric acid ester type, and phosphoric acid ester type surfactants can be exemplified and examples are carboxylic acid salts having alkyl having 8 to 24 carbon atoms, sulfonic acid salts, sulfates, and phosphates.

As the cationic surfactant to be used as the (B) component, quaternary ammonium salts can be exemplified and examples are alkyltrimethylammonium chloride, dialkyldimethylammonium chloride and benzalkonium chloride, including an alkyl(s) having 8 to 24 carbon atoms.

As the amphoteric surfactant to be used as the (B) component, amino acids and betaine can be exemplified and examples are alkyltrimethylaminoacetic acid betaine, alkyldimethylamine oxide, alkylcarboxymethylhydroxyethylimidazolinium betaine, alkylamidepropylbetaine, alkylhydroxysulfobetaine.

In the bulking agent for the preferred paper of the present invention, the contents of (α) and (β) are 80 to 99.9% by weight for (α) and 0.1 to 20% by weight (β). In the case another component other than (α) and (β) is added, the content of (α) in the total of (α) and (β) is preferably 80 to 99.9% by weight.

In the bulking agent for the preferred paper of the present invention, the contents of the ester compound (α) and the copolymer (β) are 80 to 99.9% by weight, preferably 90 to 99% by weight, and more preferably 95 to 98% by weight for (α) and 0.1 to 20% by weight, preferably 1 to 10%, and more preferably 2 to 5% by weight for (β).

The bulking agent for paper of the invention may be used in the form of a solid or a solution, and from the viewpoint of exhibition of the effects, an emulsion containing the ester compound (α) and the copolymer (β) is preferable.

Although not wanting to be limited by theory, since the mechanism of the exhibition of the effects of the invention is not necessarily made clear, it is supposed as follows. It is supposed that when the ester compound (α) of the invention is added to a pulp slurry and fixed on the pulp surface, that makes the pulp surface hydrophobic and accordingly, the interfacial tension between the pulp and the aqueous solution is increased and the gaps in the pulp are increased to give a pulp sheet with a high bulk density and to increase the optical reflectivity and consequently the opacity and the whiteness can be improved. In the invention, further it is also supposed that addition of the copolymer (β) improves the dispersibility of the ester compound (α) in the pulp slurry and efficiently fixes the ester compound (α) on the pulp surface. Accordingly, a higher bulk density, a better opacity and a better whiteness than those achieved by addition of a conventional bulking agent for paper can be provided.

(Emulsifying Substance)

The emulsifying substance works as the (β) component and is a component to be added based on necessity. The emulsifying substance may be any substance capable of emulsifying an oil chemical agent for paper manufacturing and examples are common emulsifying agents and substances capable of producing an emulsion state (the state in between two types of liquids which are mutually difficult to be dissolved in each other, where one forms a continuous phase and the other exists in the form of fine particles in a dispersion phase so as to form a relatively stable system) as well.

As the emulsifying substance, nonionic surfactants, anionic surfactants, cationic surfactants, amphoteric surfactants, and polymer substances for emulsifying based on the protective colloid forming ability or surface-activating ability are preferred.

As the nonionic surfactant, glycerin fatty acid esters, sucrose fatty acid esters, polyoxyalkylene ethers can be exemplified: as anionic surfactants, fatty acid salts, alkylbenzenesulfonic acid salts, alkyl sulfuric acid esters can be exemplified: as cationic surfactants, alkylamine salts and quaternary ammonium salts can be exemplified: and as amphoteric surfactants, alkylbetaine and amine oxides can be exemplified.

As the polymer substances, examples are cellulose type substances such as cationic cellulose and methyl cellulose; starch type substances such as alkyl starch, cationic starch, and octenylsuccinic acid starch; polysaccharides such as gum arabi, guar gum, and xanthan gum; protein type substances such as sodium caseinate; synthetic polymers such as polyvinyl alcohol and synthetic polymers containing a cationic group and an alkyl group in one molecule.

Among them, those having a cationic property in water such as cationic cellulose, cationic starch, and the synthetic polymers containing a cationic group and an alkyl group in one molecule are preferable-since they can provide the cationic property to the oil chemical agent for paper manufacturing and increase the fixation of the agent on the pulp (bearing minus charge on the surface in water) or the like.

Further, the synthetic polymers containing a cationic group and an alkyl group in one molecule are preferable since they can improve the emulsion and the stability of the emulsion during the drying process by adjusting the ratio of the cationic group/alkyl group and the molecular weight depending on the characteristics of the paper manufacturing chemical agent.

<(C) Component>

Water-soluble saccharides, which correspond to the (C) component and which is only added based on necessity, are different compounds from the (A) component and (B) component. The (C) component may be used for improving the forming property, and for making a powder from easily, and has the property of a water-soluble solid matrix.

(Water-Soluble Solid Matrix)

Examples of the component forming the water-soluble solid matrix (a water-soluble solid matrix-forming agent) may include water-soluble saccharides such as glucose, fructose, lactose, maltose, and sucrose; hydrolyzed starch such as dextrin, maltodextrin, and cyclodextrin; processed starch such as octenylsuccinic acid starch; gelatin, agar, sodium carboxymethylcellulose, and polyvinyl alcohol. They may be terminal-modified to suppress the deformation or humidity absorption at the time of storing the powder chemical agent particles for paper manufacturing.

Among them, starch such as maltodextrin, cyclodextrin, octenylsuccinic acid starch are preferable since they give a water-soluble solid matrix with a dense structure. Herein, the dense structure means a structure of a water-soluble solid matrix having voids, though the void diameter is very small (fine voids).

Among them, dextrin is even more preferable in terms of the solubility, humidity absorbing property, and particle formability.

<Powder Composition for Paper Manufacturing>

The composition of the invention contains a compound (α) or an oil chemical agent for paper manufacturing as the (A) component, a copolymer (β) or an emulsifying substance as the (B) component, and based on necessity, optionally the (C) component or a water-soluble solid matrix, and other components.

The content of the (A) component is preferably 20 to 99.99% by weight, more preferably 40 to 99.99% by weight, and even more preferably 50 to 99.99% by weight in the composition of the invention.

The content of the (B) component is preferably 0.01 to 80% by weight, more preferably 0.01 to 60% by weight, and even more preferably 0.01 to 50% by weight in the composition of the invention.

The content of the (C) component in the case of adding the component is preferably 5 to 70% by weight, more preferably 7 to 60% by weight, and even more preferably 10 to 50% by weight in the composition of the invention.

The mixing ratio of [(A)+(B)]/(C) in the case of adding the (C) component is preferably (95/5) to (30/70), more preferably (95/5) to (50/50), and even more preferably (90/10) to (50/50).

The composition of the invention is preferable to have an average particle diameter preferably 0.1 to 2,000 μm, more preferably 1 to 1,000 μm, even more preferably 10 to 700 μm, and even more preferably 20 to 500 μm.

The average particle diameter is a value measured by a light-scattering method (relative refractive index: 1.20; particle diameter standard: volume) by using LA-910 manufactured by Horiba Seisakusho Co., Ltd. Water is used as the dispersant at the time of the measurement in the case of a composition containing no (C) component and ethanol is used in the case of a composition containing the (C) component. However, in both cases, if the composition is found having an average particle diameter exceeding 50 μm, the measurement is may not be accurate because of precipitation of large particles, a dry sieving method according to JIS K-3362 is employed. The average particle diameter measured by the dry sieving method is on the basis of weight, and such a value is employed.

In the case of spray drying, which will be described later, the average particle diameter is preferably 20 to 500 μm in terms of the dispersibility in water and powder yield.

The composition of the invention can be produced by methods such as a method including adjusting the particle diameter for the respective components by pulverizing them using a mortar if necessary and dry-blending the resulting powders; a method including spray-drying emulsions containing the respective components (preferably at 100 to 200° C.); and a method including freeze-drying emulsions containing the respective components.

With respect to the composition of the invention, in the case of the system containing the (A) and (B) components in combination, the powder particles are preferably respectively in an evenly mixed state and in the case of the system containing the (A), (B), and (C) components in combination, the powder particles are preferably in a state that the (A) component evenly dispersed by the function of the (B) component is enclosed with the (C) component (the (C) component forms a coating on the powder particles).

The powder particles contained in the composition of the invention is produced preferably in such a manner that the particles are provided with hollow parts on the inside by carrying out a drying treatment in the production process and even more preferably in such a manner that the particles are provided with hollow parts near the center parts. It is preferable to form hollow parts as described above since the collapsing property of the powder particles in the case of dispersion in water can be increased and accordingly the dispersibility of the particles in water can also be improved.

Since the composition of the invention contains the (A) and (B) components, or the (A), (B) and (C) components; is in a powder state having a particle diameter in a prescribed range; and is made to have a hollow structure, the composition has extremely high dispersibility in water at a normal temperature (20 to 30° C.) so that there is no need to use hot water or an emulsification facility such as a line mixer or the like and accordingly the production process can be simplified and the productivity can remarkably be improved.

<Paper Manufacturing Chemical Agent Particle>

The paper manufacturing chemical agent particle of the invention may contain an oil chemical agent for paper manufacturing enclosed in the form of oil droplets dispersed in a water-soluble solid matrix and may contain an emulsifying substance based on necessity.

The water-soluble solid matrix encloses the oil droplets (the oil chemical agent for paper manufacturing) and forms a coating on the paper manufacturing chemical agent particle. The oil droplets (the oil chemical agent for paper manufacturing) are enclosed in the water-soluble solid matrix and may be partially exposed to the coating. The oil droplets (the oil chemical agent for paper manufacturing) are preferable to exist while being fixed so as not to move in the water-soluble solid matrix. Additionally, by a drying treatment in the production process, some particles having hollow parts (near center parts) exist in the composition.

The shape of the paper manufacturing chemical agent particle is not particularly limited and it may be spherical or amorphous and can be formed into a desired shape.

The average diameter of the oil droplets is preferably 0.1 to 50 μm, more preferably 0.1 to 30 μm, and even more preferably 0.5 to 10 μm on the basis of standardized volume. The average diameter on the basis of the standardized volume is measured by the light-scattering method using LA-910 manufactured by Horiba Seisakusho Co., Ltd.

By adjusting the diameter of the oil droplets to be 50 μm or smaller, the dispersibility can be improved in the case of adding the droplets in the paper manufacturing process and therefore, no large agglomerates exist on the pulp surface and accordingly oil spot formation and unevenness of the properties can be prevented. By adjusting the diameter of the oil droplets to be 0.1 μm or larger, the amount of the emulsifying substance used can be saved and emulsification can be carried out to make the production easy.

It is desirable to suppress existence of the oil droplets of 300 μm or larger as much as possible since the droplets become direct causes of oil spot formation and therefore their content in the oil droplets is preferably suppressed to be 1% by volume or less and more preferably 0.1% by volume or lower.

With respect to the diameter of the oil droplets, in the case the particle diameter of the oil droplets in the emulsion solution at the time of production and the particle diameter in the case of re-dispersion at use in the paper manufacturing process are the same, the emulsion solution and the emulsified state at the time of drying can be stable and particles are excellent in the capsulated state [the state that the oil droplets (the oil chemical agent for paper manufacturing) are dispersed and enclosed in the water-soluble solid matrix] and accordingly the above-mentioned case is advantageous in terms of the stability of the properties and functions and the productivity at the time of drying. However, if the average particle diameter is in a range of 50 μm or smaller, even if a slight amount of agglomerates are formed in a re-dissolved product owing to insufficient stability at the time of drying, it causes no practical problems and without requiring special facilities in the actual paper manufacturing sphere, the oil chemical agent for paper manufacturing can exhibit effects as the paper manufacturing chemical agent only by being dispersed in cold water.

The average particle diameter of the paper manufacturing chemical agent particle is preferably 10 to 3,000 μm, more preferably 50 to 1,000 μm, and furthermore preferably 100 to 500 μm. If the average particle diameter is 10 μm or larger, the ratio of oil droplets to be exposed to the particle surface is low and the dispersibility in cold water is high and therefore it is preferable. On the other hand, if the average particle diameter is 3,000 μm or smaller, a widely employed drying facility can be used and the productivity is high and therefore it is preferable. Further, in the case of using a spray_drying method for the drying, the average particle diameter is desirable to be 500 μm or smaller because of the limit of the facilities. The measurement method of the average particle diameter is the same as the measurement method of the paper manufacturing chemical agent particle in the Examples to be described later.

(Other Components)

The paper manufacturing chemical agent particle of the invention may contain another component such as a dispersant, a coloring substance, a solvent or an inorganic salt in the way the amount thereof and the kind thereof may not deteriorate the emulsion stability in water.

(Contents of Respective Components)

The content of the paper manufacturing chemical agent particle in the water-soluble solid matrix is preferably 5 to 90% by weight, more preferably 10 to 70% by weight, and even more preferably 20 to 50% by weight in terms of suppression of the production cost and increase of the dispersibility of the oil chemical agent for paper manufacturing.

The content of the oil chemical agent for paper manufacturing in the paper manufacturing chemical agent particle is preferably 10 to 95% by weight, more preferably 30 to 90% by weight, and even more preferably 50 to 80% by weight in terms of suppression of the production cost and increase of the dispersibility of the oil chemical agent for paper manufacturing.

The content of the emulsifying substance in the paper manufacturing chemical agent particle in the case of using the substance is adjusted depending on the kind and the amount of the oil chemical agent for paper manufacturing and the aimed diameter of the oil droplets and is preferably 0.1 to 30% by weight, more preferably 0.5 to 20% by weight, and even more preferably 1 to 10% by weight.

The processed starch or the like may have both a matrix forming ability and an emulsifying function and in such a case, the total amount is preferably in the above-mentioned range.

<Production Method of Paper-Manufacturing Chemical Agent Particle>

Each step of the production method of the paper manufacturing chemical agent particle will be described. The following respective steps may be respectively independent steps or may be a process including a series of two or more steps. If necessary, other steps may be properly added.

In the first step, a water-soluble solid matrix forming agent is dissolved in water adjusted at a temperature not lower than the melting point of an oil chemical agent for paper manufacturing. After that, in a successive step, the oil chemical agent for paper manufacturing and an emulsifying substance are added to the aqueous solution of the water-soluble solid matrix forming agent to emulsify the oil chemical agent for paper manufacturing and obtain an emulsion.

The addition amount of water is preferably 20 to 80 parts by weight, more preferably 25 to 70 parts by weight, and even more preferably 30 to 60 parts by weight in 100 parts by weight of the entire emulsion. If the addition amount of water is 20 parts by weight or more, the emulsifying substance sufficiently works, so that a stable emulsion solution can be obtained. If the addition amount of water is 80 parts by weight or less, the amount of water to be removed in the drying step is small, so that the productivity is improved.

In the treatment step, in order to carry out emulsification and dispersion so as to adjust the oil chemical agent for paper manufacturing to have a stable and desired oil droplet diameter (an average 0.1 to 50 μm on the basis of volume) it is preferable to use a stirring type emulsifying apparatus such as a static emulsifying and dispersing apparatus, a homo-mixer; a high pressure emulsifying apparatus such as a homogenizer; and a line mixer.

When the emulsifying substance has cationic property in water, the obtained emulsion preferably has an acidic value of pH in order to prevent oil drops of the paper manufacturing chemical agent from associating with each other. This is caused by an enhanced cationic property of the emulsifying substance in the acidic liquid and an eventual enhancement of the emulsifying function to improve capsulation. The liquid diluted with water for the emulsion so as to have a solid content of 10% by weight has preferably a pH of 2 to 6, more preferably 3 to 5.

In order to adjust the pH in the acid region, the emulsion may be acidified with an acidic component contained in the raw material or may be adjusted for the pH with an acidic substance such as phosphoric acid in any step of preparation of the emulsion.

In the next step, the emulsion obtained in the previous step is dried. The drying temperature in the step is preferably a melting point of the paper manufacturing chemical agent particle or higher since agglomeration of oil droplets in the drying step can be suppressed. Practically, it is preferred to carry out the drying treatment at a temperature in a range of 100 to 250° C.

Attributing to the fact that the drying is carried out at a temperature not lower than the melting point of the oil chemical agent for paper manufacturing as described above, the oil chemical agent for paper manufacturing can be dispersed and fixed in the water-soluble solid matrix while the oil chemical agent for paper manufacturing is kept in the oil droplet state (as the average oil droplet diameter is kept 0.1 to 50 μm on the basis of volume). Therefore, even in the case of storage at the melting point or a lower temperature or dissolution in water at the melting point or a lower temperature for addition to the paper manufacturing step after the granulation, agglomerates are hardly formed.

As the drying method, spray drying, vacuum drying, freeze drying, belt drying, shelf drying, and drum drying can be employed and among these drying methods, spray drying is preferable.

Subsequently, the obtained paper manufacturing chemical agent particle may be subjected to the secondary treatment. For example, removal of fine powder and coarse powder by sieving; adjustment of particle diameter by granulation or pulverization treatment; shaping; coloration by a pigment or a dye; and coating treatment for stability improvement. Further, for the purpose of improving the stability in the paper manufacturing sphere and the quality, a dispersant and a stabilizer may be added to obtain a composition containing the paper manufacturing chemical agent particle.

<Pulp Sheet Production Method and Pulp Sheet>

The pulp sheet production method of the invention involves adding the composition of the invention directly to a pulp slurry or adding the composition previously dispersed in water to the pulp slurry in a known paper manufacturing process.

The production method of the invention can be applied widely for mechanical pulp such as thermomechanical pulp (TMP), virgin pulp such as chemical pulp including hard wood bleached pulp (LBKP), and pulp raw material such as wastepaper pulp, and their mixed raw materials.

In the preferred production method of the invention, the composition is added (interpolated) to a pulp slurry before the paper manufacturing step in the pulp sheet production or water to be used. The addition point is before the paper manufacturing step of forming a paper layer by filtering a diluted solution of the pulp raw material with a metal mesh and may be in a mixing chest, a seed box, a tank such as a machine chest, a head box, a white water tank, or in a pipe (e.g. a fan pump) connected to each of these facilities and it is preferably the mixing chest, a seed box, a machine chest, or a fan pump where the composition can evenly be blended with the pulp raw material.

In the invention, based on necessity, a sizing agent, a filler, a yield improving agent, a filtration improving agent, a paper strength improver, aluminum sulfate, a compound containing an acrylamide group, or a fixing promoting agent such as polyethylene imine (fixing promoter on pulp) may be used in combination and these components are preferably added separately from the composition of the invention in the pulp sheet production process.

In the production method of the invention, the bulking agent for paper is preferably added to the pulp raw materials and subjected to paper manufacturing as it is so as to leave a large portion of the agent in the resulting pulp sheet.

In the case the paper manufacturing chemical agent particle of the invention is used for the paper manufacturing method, when the agent is added to water-containing pulp raw materials, the water-soluble solid matrix is dissolved in water and the oil droplets (the oil chemical agent for paper manufacturing) are quickly dispersed and mixed with the pulp raw materials. Then, the resulting pulp raw material mixture is subjected to paper manufacturing as it is and the oil droplets (the oil chemical agent for paper manufacturing) remain in the pulp sheet and accordingly, the function of the agent can be exhibited.

In the production method of the invention, the composition improves the paper quality and increases the workability even if the addition amount is as small as 0.01 to 5 parts by weight, especially 0.1 to 2 parts by weight in 100 parts by weight of the pulp raw materials.

Further, the pulp sheet obtained by employing the production method of the invention may be used preferably for paper or paper sheets such as roll paper for news paper, printing and information paper, wrapping paper, sanitary paper and the like among the classified items described in "Kami Parupu Gijutsu Binran (Technology Handbook of the Pulp and Paper Industry)", Japan Technical Association of the Pulp and Paper Industry, p. 455-460 (1992).

EXAMPLES

The following examples further describe and demonstrate embodiments of the present invention. The examples are given solely for the purpose of illustration and are not to be construed as limitations of the present invention.

<Production Method of Powder Composition for Paper Manufacturing>

Powder compositions for paper manufacturing were produced by employing different powdering methods as described following from the respective components as example products of the invention and comparative products shown in Table 1 and Table 1-2.

1) Pulverization/dry blend: After being dry-blended, the respective components were pulverized by a mortar and sieved by a sieve to adjust the particle diameter;

2) Spray drying: An even emulsion of the respective components was spray-dried at 140 to 200° C. (RA-302MZ manufactured by Ashizawa-Niroatomizer, Co., Ltd.);

3) Freeze dry method: A frozen mixture of the respective components was stored in reduced pressure and freeze-dried (by FREEZE DRYER FDV-540, manufactured by Tokyo Rika Kikai Co., Ltd.);

4) Only pulverization (Comparative products 6 to 8): Products obtained by pulverization in a mortar; product 5 was a product liquid at a room temperature).

Incidentally, FIG. 1 shows a cross-sectional photograph (scanning electron microscopic photograph) of the powder of Example 3 shown in Table 1. From the SEM photograph of FIG. 1, it was found that hollow parts existed in the center parts of the powder and the remaining surface had a dense structure having fine voids.

<Paper Manufacturing Method Using the Powder Composition for Paper Manufacturing>

A pulp slurry containing 1% by weight of LBKP was weighed to adjust the basis weight of the sheet after paper manufacturing to be 80 g/m$^2$ and thereafter, aluminum sulfate 0.5% by weight (to the pulp amount), Cato 302 as cationic starch (manufactured by Nippon N.S.C.) 0.3% by weight, Cyreen 94 as an alkyl ketene dimer sizing agent (manufactured by Kao Corporation) 0.2% by weight, Whiton PC as precipitated calcium carbonate (manufactured by Shiraishi Calcium Kaisha, Ltd.) 15% by weight were successively added in while stirring, and the pulp concentration was diluted to be 0.5% by weight.

According to the addition methods shown in Table 1 and Table 1-2, under stirring conditions at room temperature (20 to 25° C.), compositions of the products of the invention and compositions of comparative products were added in an amount of the (A) component 1.0% by weight to the pulp and as a yielding agent, Percol 47 (manufactured by Ciba Specialty Chemicals Inc.) 0.015% by weight was added. The addition by a water dilution method was carried out by producing an aqueous solution containing the (A), (B), and (C) components in an amount of 1% by weight in total and adding the aqueous solution in a proper amount so as to adjust the content of the (A) component to be 1.0% by weight.

The obtained slurries were subjected to paper manufacturing by 150 mesh wire using a round type (TAPPI) paper manufacturing apparatus to obtain wet paper sheets. Each wet paper sheet was sandwiched on both surfaces by two sheets of No. 26 round type filtration paper sheets manufactured by Advantec and pressed at 3.5 kg/cm$^2$ for 5 minutes and dried at 105° C. for 2 minutes by a specular drier. Each dried sheet was subjected to moisture adjustment in the conditions of 23° C. and 50% RH for 1 day and then subjected to the measurement for the respective items shown in Table 1 and Table 1-2.

TABLE 1

|  |  | Composition | | | | Powdering | Melting point of (A) | Transmittance | |
|---|---|---|---|---|---|---|---|---|---|
|  |  | (A) | (B) | (C) | Mixing ratio (wt. %) | method | (° C.) | (%) | State |
| Example | 1 | A-1 | B-1 | — | 80/20 | pulverizing, dry blending | 52 | 0 | powder |
|  | 2 | A-1 | B-8 | C-1 | 50/1.3/48.7 | spray drying | 52 | 0 | powder |
|  | 3 | A-1 | B-9 | C-1 | 70/1.8/28.2 | spray drying | 52 | 0 | powder |
|  | 4 | A-1 | B-11 | C-1 | 70/1.8/28.2 | spray drying | 52 | 0 | powder |
|  | 5 | A-2 | B-6 | C-1 | 50/4/46 | spray drying | ≧50 | 0 | powder |
|  | 6 | A-3 | B-3 B-5 | C-1 | 50/2/1/47 | spray drying | 70 | 0 | powder |
|  | 7 | A-4 | B-2 | — | 90/10 | pulverizing, dry blending | 64 | ≦1 | powder |
|  | 8 | A-4 | B-7 | C-1 | 50/2/48 | Freeze drying | 64 | ≦1 | powder |
|  | 9 | A-5 | B-3 B-4 | C-1 | 60/5/15/20 | spray drying | ≦10 | 0 | powder |
|  | 10 | A-5 | B-10 | C-1 | 60/1.5/38.5 | spray drying | ≦10 | 0 | powder |
|  | 11 | A-6 | B-3 B-5 | C-1 | 50/3/2/45 | spray drying | ≦0 | separation | powder |
| Comparative example | 1 | A-7 | — | C-1 | 60/40 | spray drying | 11 | 0 | paste |
|  | 2 | A-8 | B-6 | — | 97.2/2.5 | spray drying | 42 | separation | solid |
|  | 3 | A-9 | B-5 | — | 95/5 | spray drying | 84 | separation | solid |
|  | 4 | A-10 | B-10 | C-1 | 50/1/49 | spray drying | 28 | 80≦ | solid |
|  | 5 | A-11 | — | — | — | — | −5 | 80≦ | liquid |
|  | 6 | A-12 | — | — | — | only pulverization | ≧50 | 0 | solid |
|  | 7 | A-1 | — | — | — | only pulverization | 52 | 0 | solid |
|  | 8 | A-2 | — | — | — | only pulverization | ≧50 | 0 | solid |
|  |  | Blank (addition of sizing agent) | | | | | | | |

|  |  | Average particle diameter (μm) | yield (%) | Dispersibility | Addition method | Dencity (g/cm$^3$) | Whiteness | Opacity (%) | Stöckigt sizing degree (second) | Oil spot |
|---|---|---|---|---|---|---|---|---|---|---|
| Example | 1 | 50 | — | ◯ | dilution with water | 0.475 | 87.5 | 92.2 | 71 | none |
|  | 2 | 230 | 85 | ◎ | as it is | 0.460 | 87.6 | 92.9 | 72 | none |
|  | 3 | 195 | 90 | ◎ | as it is | 0.461 | 87.5 | 92.9 | 75 | none |
|  | 4 | 180 | 85 | ◎ | dilution with water | 0.462 | 87.4 | 92.8 | 74 | none |
|  | 5 | 185 | 85 | ◎ | dilution with water | 0.465 | 86.8 | 92.7 | 75 | none |
|  | 6 | 200 | 70 | ◎ | dilution with water | 0.467 | 86.5 | 92.3 | 68 | none |
|  | 7 | 40 | — | ◯ | dilution with water | 0.478 | 86.7 | 91.8 | 72 | none |
|  | 8 | 150 | — | ◎ | as it is | 0.475 | 86.6 | 92.0 | 71 | none |
|  | 9 | 190 | 65 | ◎ | dilution with water | 0.463 | 87.0 | 92.5 | 45 | none |
|  | 10 | 220 | 90 | ◎ | dilution with water | 0.462 | 87.1 | 92.6 | 43 | none |
|  | 11 | 215 | 65 | ◎ | dilution with water | 0.480 | 87.2 | 92.3 | 40 | none |
| Comparative example | 1 | — | 5 | X | dilution with water | 0.528 | 85.1 | 90.5 | 10 | none |
|  | 2 | 8730 | 10 | X | dilution with water | 0.531 | 84.9 | 90.8 | 25 | existing |
|  | 3 | 5900 | 5 | X | dilution with water | 0.529 | 85.2 | 90.6 | 49 | existing |
|  | 4 | 6350 | 5 | X | dilution with water | 0.532 | 85.3 | 90.9 | 13 | none |
|  | 5 | — | — | — | dilution with water | 0.528 | 84.8 | 90.7 | 3 | none |
|  | 6 | 3500 | — | X | dilution with water | 0.530 | 85.0 | 90.5 | 51 | existing |
|  | 7 | 5250 | — | X | dilution with water | 0.528 | 85.1 | 90.6 | 52 | existing |
|  | 8 | 6050 | — | X | dilution with water | 0.527 | 85.1 | 90.5 | 49 | existing |
|  |  | Blank (addition of sizing agent) | | | | 0.530 | 85.0 | 90.8 | 50 | none |

TABLE 1-2

| | Composition | | | | Powdering method | Melting point of (A) (°C.) | Transmittance (%) | State | Average particle diameter (μm) |
|---|---|---|---|---|---|---|---|---|---|
| | (A) | (B) | (C) | Mixing ratio (wt. %) | | | | | |
| Example | A-1 | B-12 | C-1 | 70/1.8/28.2 | spray drying | 52 | 0 | powder | 180 |
| | A-1 | B-13 | C-1 | 70/1.8/28.2 | spray drying | 52 | 0 | powder | 190 |
| | A-1 | B-14 | C-1 | 70/1.8/28.2 | spray drying | 52 | 0 | powder | 180 |
| | A-1 | B-15 | C-1 | 70/1.8/28.2 | spray drying | 52 | 0 | powder | 175 |
| | A-1 | B-16 | C-1 | 70/1.8/28.2 | spray drying | 52 | 0 | powder | 180 |
| | A-1 | B-17 | C-1 | 70/1.8/28.2 | spray drying | 52 | 0 | powder | 185 |

| | yield (%) | Dispersibility | Addition method | Dencity (g/cm³) | Whiteness | Opacity (%) | Stöckigt sizing degree (second) | Oil spot |
|---|---|---|---|---|---|---|---|---|
| Example | 87 | ⊚ | dilution with water | 0.476 | 87 | 92.5 | 70 | none |
| | 87 | ⊚ | dilution with water | 0.473 | 87.3 | 92.7 | 68 | none |
| | 80 | ⊚ | dilution with water | 0.462 | 87.3 | 92.7 | 75 | none |
| | 90 | ⊚ | dilution with water | 0.463 | 86.8 | 92.8 | 72 | none |
| | 87 | ⊚ | dilution with water | 0.470 | 86.5 | 92.7 | 71 | none |
| | 80 | ⊚ | dilution with water | 0.466 | 86.8 | 92.8 | 71 | none |

<Method for Manufacturing Paper for Evaluating Sizing Property without Addition of Sizing Agent>

A pulp slurry containing 1% by weight of LBKP was weighed to adjust the basis weight of the sheet after paper manufacturing to be 80 g/m² and according to the addition methods shown in Table 2, under stirring conditions at room temperature (20 to 25° C.), compositions of the example products of the invention and compositions of comparative products were added to include 1.0% by weight to the pulp of the component (A).

The obtained slurries were subjected to paper manufacturing by 150 mesh wire using a round type paper manufacturing apparatus to obtain wet paper sheets. Each wet paper sheet was sandwiched on both surfaces by two sheets of No. 26 round type filtration paper sheets manufactured by Advantec and pressed at 3.5 kg/cm² for 5 minutes and dried at 105° C. for 2 minutes by a specular drier. Each dried sheet was subjected to moisture adjustment in the conditions of 23° C. and 50% RH for 1 day and then subjected to the sizing property of the obtained paper.

<Transmittance>

The transmittance (%) of an aqueous solution of 1.0% by weight of each composition at 20° C. was measured by using an optical path 10 mm and visible light with wavelength of 660 nm.

<Average Particle Diameter Measurement Method>

Under the conditions described in "Detailed description of the invention", measurement was carried out by light-scattering method by using LA-910 manufactured by Horiba Seisakusho Co., Ltd. and a dry sieving method.

<Yield Measurement Method>

Calculation was carried out from the amount of the obtained powder against the solid matter amount the total amount of the (A), (B), and (C) components in each emulsion to be sent to a spraying type drier.

<Dispersibility in Water>

Each of the example products of the invention and the comparative products 1 g was added to water 100 g (25° C.) at room temperature (20 to 25° C.) and stirred by a DC stirrer for 1 hour and the dispersion state was evaluated according to the

TABLE 2

| | | Composition | | | | Powdering method | State | Dispersibility | Addition method | Stockigt sizing degree (second) |
|---|---|---|---|---|---|---|---|---|---|---|
| | | (A) | (B) | (C) | Mixing ratio (wt. %) | | | | | |
| Example | 12 | A-13 | B-4 | — | C-1 | 50/20/30 | spray drying | powder | ⊚ | dilution with water | 42 |
| | 13 | A-14 | B-8 | — | C-1 | 50/2/48 | spray drying | powder | ⊚ | dilution with water | 68 |
| | 14 | A-15 | B-3 B-5 | C-1 | 50/7/1/42 | spray drying | powder | ⊚ | dilution with water | 65 |
| Comparative example | | | | Blank (no sizing agent addition) | | | | | | 0 | following standards. Coarse particles mean those observable with the naked eye.

⊚: evenly dispersed and no coarse particle was observed:

○: evenly dispersed but coarse particles were observed:

Δ: unevenly dispersed and precipitates existed and coarse particles were observed: and x: not dispersed.

The foam generated immediately after shaking was compared with that in the case without the example composition of the invention.

○: less than 10 ml foaming amount,

Δ: not less than 10 ml and less than 30 ml foaming amount, and x: not less than 30 ml foaming amount.

TABLE 3

| | | Composition | | | Powdering | | | Addition | |
|---|---|---|---|---|---|---|---|---|---|
| | (A) | (B) | (C) | Mixing ratio (wt. %) | method | State | Dispersibility | method | Antifoaming |
| Example 15 | A-16 | B-10 | — | C-1 | 50/1.8/48.2 | spray drying | powder | ⊚ | as it is | ○ |
| Comparative example | | | | Blank (addition of sizing agent) | | | | | X |

<Density>

The basis weight (g/m$^2$) and the thickness (μm) of paper were measured to calculate the density (g/m$^3$) according to the following formula: (basis weight/thickness). With respect to the density, as the absolute value is smaller, the bulk density is higher and the difference 0.02 of the density is regarded as a significant difference.

<Whiteness>

The whiteness degree was measured on the basis of Hunter's brightness according to JIS P 8123.

<Opacity>

Opacity was measured according to JIS P8138A.

<Oil Spot Determination Method>

Existence of stains with oil droplets on paper was observed by observation.

<Sizing Property>

The stocking method according to JIS P8122-54 was employed.

<Defoaming Property>

A pulp slurry containing 1% by weight of LBKP was weighed to adjust the basis weight of the sheet after paper manufacturing to be 80 g/m$^2$ and thereafter, aluminum sulfate 0.5% by weight (to the pulp amount), Cato 302 as cationic starch (manufactured by Nippon N.S.C.) 0.3% by weight, Cyreen 94 as an AKD sizing agent (manufactured by Kao Corporation) 0.2% by weight, Whiton PC as precipitated calcium carbonate (manufactured by Shiraishi Calcium Kaisha, Ltd.) 15% by weight were successively added in a stirring condition, and the pulp concentration was diluted to be 0.5% by weight.

Under stirring conditions, Percol 47 (manufactured by Ciba Specialty Chemicals Inc.) 0.015% by weight was further added to obtain an inlet slurry. It was subjected to a paper manufacturing treatment by using a 150 mesh wire using a round type TAPPI paper manufacturing apparatus to obtain the filtrate (white water).

The inlet slurry and the white water (in total 100 g) were separately poured into a messcylinder equipped with a plug (capacity 250 mL) and heated to 40° C. The (A) component contains 0.1 g of the example composition of the invention. The (A) component was further added and each plugged messcylinder was strongly shaken manually for 30 seconds.

Details of the (A), (B) and (C) components in Table 1, Table 1-2, Table 2, and Table-3 are as follows:

(A) Component

A-1: Pentaerythritol stearate (average ester replacement degree 45% by equivalent), A-2: Long chain fatty acid polyamide polyamine (MW=3,000 to 4,000); obtained by dropwise adding epichlorohydrin (1/3 mole ratio) to a compound obtained by reaction of polyethylene imine (MW=1,000) and Lunac S-40 (1/7 mole ratio) manufactured by Kao Corporation, A-3: Distearylamine, A-4: Ethylene glycol monobehenate, A-5: Pentaerythritol monooleate (average ester replacement degree 45% by equivalent), A-6: Stearyl alcohol PO adduct (PO=10 mole), A-7: Oleic acid, A-8: Beef tallow, A-9: Cured castor oil, A-10: Lauryl alcohol EO Adduct (EO=15 mole), A-11: Stearyl alcohol EO/PO adduct (EO 24/PO 18 random adduct), A-12: KB-115 (manufactured by Kao Corporation) (main component: fatty acid polyhydric alcohol ester), A-13: Rosin (Hartall R-WW, manufactured by Harima Chemicals, Inc.), A-14: Alkyl ketene dimer obtained by de-hydrochloric acid reaction, in the presence of ternary amine catalyst, of fatty acid chloride obtained by the reaction of phosphoric acid trichloride with Lunac S-40 (manufactured by Kao Corporation), A-15: Alkenyl succinic acid anhydride obtained by addition reaction of Dialen 168 manufactured by Mitsubishi Chemical Industries Ltd. and maleic anhydride at 3/2 mole ratio, and A-16: Methylpolysiloxane (KF96A-1000, manufactured by Shin-Etsu Silicone Co., Ltd.).

The compounds A-1 to A-12 are bulking agents for paper and the compounds A-13 to A-15 are sizing agents, and A-16 is a defoaming agent.

(B) Component

B-1: Cetyltrimethylammonium chloride,

B-2: Sodium dedecylsulfate,

B-3: Cationic starch (Cato 308, manufactured by Nippon N.S.C.),

B-4: Octenyl succinate starch (Emulster #304, manufactured by Matsutani Kagaku Kogyo K.K.), B-5: Sugar ester (Ryoto Sugar Ester S 270, manufactured by Mitsubishi-Kasei Food Corporation), B-6: Synthesis Example 1, B-7: Synthesis Example 2, B-8: Synthesis Example 3, B-9: Synthesis Example 4, B-10: Synthesis Example 5, and B-11: Synthesis Example 6.

The compounds B-6 to B-11 are obtained by Synthesis Examples 1 to 6 shown in Table 4.

B-12 the same manner as in Synthesis Examples 5, except that monomer (I) was replaced by stearylmethacrylate, and that the (I)/(II) mole ratio was changed to 2/98, B-13 the same manner as in B-12, except that the (1)/(11) mole ratio was changed to 3/97, B-14 the same manner as in B-12, except that the (1)/(11) mole ratio was changed to 5/95, B-15 the same manner as in Synthesis Examples 5, except that monomer (I) was replaced by behenylmethacrylate, and that the (1)/(11) mole ratio was changed to 2/98, B-16 the same manner as in B-12, except that monomer I was replaced by behenylmethacrylate, and the (I)/(II) mole ratio was changed to 3/97, and B-17 the same manner as in B-12, except that monomer I was replaced by behenylmethacrylate, and the (1)/(11) mole ratio was changed to 4/96.

TABLE 4

|  | Synthesis example | | | | | |
| --- | --- | --- | --- | --- | --- | --- |
|  | 1 | 2 | 3 | 4 | 5 | 6 |
| monomer (I) | BMA | EHMA | LMA | LMA | LMA | SMA |
| monomer (II) | QDM | QDM | QDM | QDM | MOEDES | QDM |
| (I)/(II) (mole ratio) | 50/50 | 30/70 | 30/70 | 15/85 | 15/85 | 15/85 |
| Solvent (III) | methanol | methanol | methanol | ethanol | ethanol | methanol |
| Solvent (IV) | water | water | methyl ethyl ketone | — | — | methyl ethyl ketone |
| (III)/(IV) (mass ratio) | 93/7 | 90/10 | 50/50 | — | — | 50/50 |
| Initiators (V) and (VII) | V-65 | V-65 | V-65 | V-65 | V-65 | V-65 |
| (I) loading amount (g) | 48.4 | 16.4 | 276.8 | 23.8 | 101.4 | 23.8 |
| (II) loading amount (g) | 70.7 | 40.1 | 527.3 | 110 | 780 | 82.7 |
| (III) loading amount (g) | 237.3 | 95 | 801.5 | 257 | 1566.3 | 103.5 |
| (IV) loading amount (g) | 17.7 | 10 | 801.5 | — | — | 103.5 |
| Polymerization temperature (° C.) | 70 | 70 | 70 | 70 | 70 | 70 |
| 2% initiator (V) (g) | 25.9 | 18.3 | 225.2 | 42.3 | 180.2 | 31.7 |
| aging (VI) (h) | 6 | 3.5 | 1 | 1 | 1 | 1 |
| 2% initiator (VII) (g) | — | 10.1 | 67.6 | 16.9 | 72.1 | 12.7 |
| aging (VIII) (h) | — | 2.5 | 5.5 | 4 | 4 | 4 |

BMA: Butyl methacrylate
EHMA: 2-ethylhexyl methacrylate
LMA: Lauryl methacrylate
SMA: Stearyl methacrylate
QDM: dimethylaminoethyl methacrylate methyl chloride quaternary compound
MOEDES: dimethylaminoethyl methacrylate diethyl sulfate quaternary compound
V-65: 2,2'-azobis (2,4-dimethylvaleronitrile)

The synthesis method in the respective Synthesis Examples was carried out according to the following. A reaction container made of glass and equipped with a thermometer, a stirrer, a titration funnel, a nitrogen introduction pipe, and a reflux condenser was loaded with a solvent (III), a solvent (IV), a monomer (I), and a monomer (II) and replacement with nitrogen was carried out. Successively, after the temperature was increased to the polymerization temperature in the nitrogen atmosphere and then, an ethanol solution of 2% initiator (V) was dropwise added over the period of 90 minutes. Next, after aging was carried out at the same temperature for 1 to 6 hours (VI), an ethanol solution of 2% initiator (VII) was dropwise added over 30 minutes and aging was carried out at the same temperature for 0 to 6 hours (VIII) and then the resulting reaction system was cooled to obtain a copolymer solution.

(C) Component

C-1: Dextrin (Pinedex #2, manufactured by Matsutani Kagaku Kogyo K.K.)

<Production of Bulking Agent for Paper>

The respective components of Examples and Comparative Examples shown in Table 5 and Table 5-2 were used. After 100 g in total of the (α) component and (β) component and water 900 g were mixed and heated to 85° C. and then emulsified at 8,000 rpm for 30 minutes by using a T. K. Robomix (manufactured by Tokushu Kika Kogyo Co., Ltd.), the container containing the contents was immersed in ice water and quenched to room temperature (20 to 25° C.) to obtain a dispersion of the bulking agent for paper having a 10% solid matter concentration.

<Paper Manufacturing Method Using the Bulking Agent for Paper>

A pulp slurry containing 1% by weight of LBKP was weighed to adjust the basis weight of the sheet after paper manufacturing to be 80 g/m$^2$ and thereafter, aluminum sulfate 0.5% by weight (to the pulp amount), Cato 302 as cationic starch (manufactured by Nippon N.S.C.) 0.3% by weight, Cyreen 94 as an alkyl ketene dimer sizing agent (manufactured by Kao Corporation) 0.2% by weight, Whiton PC as precipitated calcium carbonate (manufactured by Shiraishi Calcium Kaisha, Ltd.) 15% by weight were successively added in a stirring condition, and the pulp concentration was diluted to be 0.5% by weight.

Further, each bulking agent for the paper of Examples and Comparative Examples was added in a proper amount so as to adjust the (α) component and (β) component to be 1.0% by weight in total at room temperature (20 to 25° C.) under stirring conditions and Percol 47 (manufactured by Ciba Specialty Chemicals Inc.) as a yielding agent 0.015% by weight was further added.

The obtained slurry was subjected to a paper manufacturing treatment by using a 150 mesh wire using a round type TAPPI paper manufacturing apparatus to obtain a wet paper sheet. The wet paper sheet was sandwiched on both surfaces by two sheets of No. 26 round type filtration paper sheets manufactured by Advantec and pressed at 3.5 kg/cm$^2$ for 5 minutes and dried at 105° C. for 2 minutes by a specular drier. Each dried sheet was subjected to moisture adjustment in the conditions of 23° C. and 50% RH for 1 day and then subjected to the measurement for the respective items shown in Table 5 and Table 5-2. In the case of using only α-2 in the Comparative Example, the dispersion state of the bulking agent for paper was separated even after the emulsification. The measurement of the respective items was not therefore carried out.

The density, the whiteness, and the opacity were measured in the same manner as Example 1.

<Stöckigt Sizing Degree>

Measurement was carried out by the Stöckigt sizing degree method according to JIS P 8122-54. That is, a specimen (2 cm×2 cm) of a paper-manufactured pulp sheet was floated on a 2% ammonium rhodanide solution at 20±1° C. in a laboratory dish and at the same time, one droplet of a solution of 1% ferric chloride at the same temperature was titrated on the specimen by a pipette and the time by seconds taken for three red color spots to appear on the specimen was measured and the measured value as defined as the sizing degree. It is preferable to keep the sizing degree to be 80% of the blank or higher in terms of the operation.

TABLE 5

| | | | Bulking agent for paper | | | | | | | |
|---|---|---|---|---|---|---|---|---|---|---|
| | Ester compound (α) | Copolymer (β) | (α)/(β) (weight ratio) | HLB of (α) | Melting point of (α) (° C.) | State after emulsification | Density (g/cm$^3$) | Whiteness (%) | Opacity (%) | Stockigt sizing degree(second) |
| Example | α-1 | β-3 | 98/2 | 6.7 | 52 | emulsion | 0.462 | 87.5 | 92.8 | 71 |
| | α-1 | β-4 | 97.5/2.5 | 6.7 | 52 | emulsion | 0.460 | 87.6 | 92.9 | 72 |
| | α-1 | β-6 | 97/3 | 6.7 | 52 | emulsion | 0.463 | 87.5 | 92.9 | 75 |
| | α-2 | β-1 | 95/5 | 3.2 | 64 | emulsion | 0.465 | 86.2 | 91.6 | 74 |
| | α-3 | β-2 | 90/10 | 6.8 | ≦10 | emulsion | 0.463 | 86.5 | 92.7 | 42 |
| | α-4 | β-3 | 98/2 | 5.1 | 66 | emulsion | 0.464 | 87.0 | 92.3 | 68 |
| | α-4 | β-5 | 97/3 | 5.1 | 66 | emulsion | 0.467 | 86.7 | 92.0 | 72 |
| | α-5 | β-3 | 95/5 | 8.8 | 52 | emulsion | 0.473 | 87.1 | 92.0 | 71 |
| | α-5 | β-4 | 98/2 | 8.8 | 52 | emulsion | 0.472 | 87.0 | 92.5 | 60 |
| | α-6 | β-6 | 92/8 | 10.8 | 61 | emulsion | 0.480 | 87.1 | 92.6 | 65 |
| Comparative xample | α-7 | β-7 | 95/5 | 11.0 | 5 | emulsion | 0.528 | 85.1 | 90.5 | 10 |
| | α-8 | β-8 | 97.5/2.5 | 11.7 | −10 | dissolution | 0.531 | 84.9 | 90.8 | 2 |
| | α-9 | β-9 | 95/5 | 1.9 | 84 | emulsion | 0.529 | 85.2 | 90.6 | 49 |
| | α-2 | β-8 | 97.5/2.5 | 3.2 | 64 | emulsion | 0.533 | 85.0 | 90.9 | 51 |
| | α-7 | β-5 | 95/5 | 11.0 | 5 | emulsion | 0.533 | 85.2 | 90.6 | 5 |
| | α-10 | β-10 | 95/5 | 15.3 | 28 | dissolution | 0.532 | 85.3 | 90.9 | 37 |
| | α-11 | | | 8.9 | −5 | dissolution | 0.528 | 84.8 | 90.7 | 3 |
| | α-2 | | | 3.2 | 64 | separation | — | — | — | — |
| | Blank | | | | | | 0.530 | 85.0 | 90.8 | 50 |

TABLE 5-2

| | | | Bulking agent for paper | | | | | | | |
|---|---|---|---|---|---|---|---|---|---|---|
| | (A) | (B) | (A)/(B) weight ratio | HLB of (A) | Melting point of (A) (° C.) | State after emulsification | Density (g/cm$^3$) | Whiteness (%) | Opacity (%) | Stockigt sizing degree(second) |
| Example | A-1 | B-11 | 97.5/2.5 | 6.7 | 52 | emulsion | 0.476 | 87.0 | 92.5 | 70 |
| | A-1 | B-12 | 97.5/2.5 | 6.7 | 52 | emulsion | 0.473 | 87.3 | 92.7 | 68 |

TABLE 5-2-continued

| | | | | | | Measurement item | | | |
|---|---|---|---|---|---|---|---|---|---|
| | | Bulking agent for paper | | | | | | | |
| | | | | Melting | | | | | |
| (A) | (B) | (A)/(B) weight ratio | HLB of (A) | point of (A) (°C.) | State after emulsification | Density (g/cm³) | Whiteness (%) | Opacity (%) | Stockigt sizing degree(second) |
| A-1 | B-13 | 97.5/2.5 | 6.7 | 52 | emulsion | 0.462 | 87.3 | 92.7 | 75 |
| A-1 | B-14 | 97.5/2.5 | 6.7 | 52 | emulsion | 0.463 | 86.8 | 92.8 | 72 |
| A-1 | B-15 | 97.5/2.5 | 6.7 | 52 | emulsion | 0.470 | 86.5 | 92.7 | 71 |
| A-1 | B-16 | 97.5/2.5 | 6.7 | 52 | emulsion | 0.466 | 86.8 | 92.8 | 71 |

The ester compound (α) and the copolymer (β) in Table 5 are as follows.

Ester Compound (α)

α-1: Pentaerythritol stearate (average ester replacement degree 45% by equivalent), α-2: Ethylene glycol monobehenate, α-3: Pentaerythritol monooleate (average ester replacement degree 45% by equivalent), α-4: Stearic acid monoglyceride, α-5: Diglycerin monomyristate, α-6: Tetraglycerin monostearate, α-7: Lauryl alcohol, α-8: Sorbitol tetraoleate EO adduct (EO=30 mole), α-9: Cured castor oil, α-10: Lauryl alcohol EO adduct (EO=15 mole), and α-11: Stearyl alcohol EO/PO adduct (EO 24/PO 18 random adduct).

Copolymer (β)

β-1: Synthesis Example 1,

β-2: Synthesis Example 2,

β-3: Synthesis Example 3,

β-4: Synthesis Example 4,

β-5: Synthesis Example 5,

β-6: Synthesis Example 6,

β-7: Merquat 100 (dimethyldiallylammonium chloride homopolymer, no composing unit derived from nonionic monomer, manufactured by ONDEO Nalco Japan), β-8: Merquat 550 (dimethyldiallylammonium chloride/acrylamide copolymer, dissolution parameter of acrylamide: 30.1, manufactured by ONDEO Nalco Japan), β-9: Ace A (oxidized starch powder, Oji Cornstarch Co., Ltd.), and β-10: Hopelon 3100C (polyacrylamide, dissolution parameter of acrylamide: 30.1, manufactured by Mitsui Chemicals Inc.).

The compounds (β-1) to (β-6) were obtained by the Synthesis Examples β1 to β6 as shown in Table 6.

β-11: the same manner as in Synthesis Examples β5, except that monomer (I) was replaced by starylmethacrylate, and that the (I)/(II) mole ratio was changed to 2/98, β-12: the same manner as in β-11, except that the (I)/(II) mole ratio was changed to 3/97, β-13: the same manner as in β-11, except that the (I)/(II) mole ratio was changed to 5/95, β-14: the same manner as in Synthesis Examples β5, except that monomer (I) was replaced by behenylmethacrylate, and that the (I)/(II) mole ratio was changed to 2/98, β-15: the same manner as in β-14, except that the (I)/(II) mole ratio was changed to 3/97, and β-16: the same manner as in β-14, except that the (I)/(II) mole ratio was changed to 4/96.

TABLE 6

| | Synthesis example | | | | | |
|---|---|---|---|---|---|---|
| | β1 | β2 | β3 | β4 | β5 | β6 |
| monomer (I) | BMA | EHMA | LMA | LMA | LMA | SMA |
| monomer (II) | QDM | QDM | QDM | QDM | MOEDES | QDM |
| (I)/(II) (mole ratio) | 50/50 | 30/70 | 30/70 | 15/85 | 15/85 | 15/85 |
| Solvent (III) | methanol | methanol | methanol | ethanol | ethanol | methanol |
| Solvent (IV) | water | water | methyl ethyl ketone | — | — | methyl ethyl ketone |
| (III)/(IV) (mass ratio) | 93/7 | 90/10 | 50/50 | — | — | 50/50 |
| Initiator (V) and (VII) | V-65 | V-65 | V-65 | V-65 | V-65 | V-65 |
| (I) loading amount (g) | 48.4 | 16.4 | 276.8 | 23.8 | 101.4 | 23.8 |
| (II) loading amount (g) | 70.7 | 40.1 | 527.3 | 110 | 780 | 82.7 |

TABLE 6-continued

| | Synthesis example | | | | | |
|---|---|---|---|---|---|---|
| | β1 | β2 | β3 | β4 | β5 | β6 |
| (III) loading amount (g) | 237.3 | 95 | 801.5 | 257 | 1566.3 | 103.5 |
| (IV) loading amount (g) | 17.7 | 10 | 801.5 | — | — | 103.5 |
| Polymerization temperature (° C.) | 70 | 70 | 70 | 70 | 70 | 70 |
| 2% initiator (V) (g) | 25.9 | 18.3 | 225.2 | 42.3 | 180.2 | 31.7 |
| Aging(VI) (h) | 6 | 3.5 | 1 | 1 | 1 | 1 |
| 2% initiator (VII) (g) | — | 10.1 | 67.6 | 16.9 | 72.1 | 12.7 |
| Aging (VIII) (h) | — | 2.5 | 5.5 | 4 | 4 | 4 |

BMA: Butyl methacrylate (dissolution parameter: 16.8)
EHMA: 2-ethylhexyl methacrylate(dissolution parameter: 16.0)
LMA: Lauryl methacrylate (dissolution parameter: 15.4)
SMA: Stearyl methacrylate (dissolution parameter: 14.3)
QDM: dimethylaminoethyl methacrylate methyl chloride quaternary compound
MOEDES: dimethylaminoethyl methacrylate diethyl sulfate quaternary compound
V-65: 2,2'-azobis (2,4-dimethyl valeronitrile)

The synthesis method in the respective Synthesis Examples was carried out according to the following. A reaction container made of glass and equipped with a thermometer, a stirrer, a titration funnel, a nitrogen introduction pipe, and a reflux condenser was loaded with a solvent (III), a solvent (IV), a monomer (I), and a monomer (II) and replacement with nitrogen was carried out. Successively, after the temperature was increased to the polymerization temperature in the nitrogen atmosphere and then, an ethanol solution of 2% initiator (V) was dropwise added for 90 minutes. Next, after aging was carried out at the same temperature for 1 to 6 hours (VI), an ethanol solution of 2% initiator (VII) was dropwise added for 30 minutes and aging was carried out at the same temperature for 0 to 5 hours (VIII) and then the resulting reaction system was cooled to obtain a copolymer solution.

(1) Component (Water-Soluble Solid Matrix Forming Agent)

Emulstar 30: processed starch powder, manufactured by Matsutani Kagaku Kogyo K.K.

Pinedex #2: maltodextrin, manufactured by Matsutani Kagaku Kogyo K.K.

(Oil Chemical Agent for Paper Manufacturing)

Bulking agent A': Pentaerythritol stearate, average ester replacement degree 45% by equivalent, melting point about 50° C.

(Emulsification Substance)

Cationic starch 1: a cationic tapioca starch powder (N %=0.04%),

Cationic starch 2: a cationic corn starch powder (N %=0.6%)

Sugar Ester S 270: an emulsifier manufactured by Mitsubishi-Kasei Food Corporation, Cation polymer: a synthesized polymer obtained by polymerization of lauryl methacrylate/diemethylaminoethyl methacrylate methyl chloride quaternary compound=15 mol. %/85 mol. %.

Cation polymer 2: a synthesized polymer obtained by polymerization of stearyl methacrylate/diemethylaminoethyl methacrylate diethyl sulfate quaternary compound=2 mol. %/98 mol. %.

Cation polymer 3: a synthesized polymer obtained by polymerization of behenyl methacrylate/diemethylaminoethyl methacrylate diethyl sulfate quaternary compound=2 mol. %/98 mol. %.

(2) Evaluation Method (Oil Droplet Diameter Measurement for Oil Chemical Agent for Paper Manufacturing)

Measurement was carried out using water as a dispersant by a light-scattering method by using LA-910 manufactured by Horiba Seisakusho Co., Ltd.

(Average Particle Diameter of Paper Manufacturing Chemical Agent Particle)

Using ethanol as a dispersant, measurement was carried out by a light-scattering method using LA-910 manufactured by Horiba Seisakusho Co., Ltd. In the case an average particle diameter exceeded 50 μm, it was possible that the measurement was not accurate because of precipitation or the like of large particles, therefore a dry sieving method according to JIS K-3362 was employed. The average particle diameter measured by the dry sieving method was on the basis of weight, and such a value was employed in stead. The numeric values in the Examples show the average particle diameter on the basis of volume measured by the light-scattering method if the values are 50 μm or smaller and the numeric values show the average particle diameter on the basis of weight measured by the dry sieving method if the values exceed 50 μm.

(Actual Addition Ratio of Agent)

It is the addition amount % by weight of an agent to pulp. The actual addition means the addition amount of a chemical agent (an example paper manufacturing chemical agent particle of the invention or KB 115) regardless of the content of the main base agent.

(Kett Water Content)

The Kett water content was calculated and measured by detecting the drying weight loss by after drying.

The measurement conditions were as follows:

About 2 g of a specimen was dried at 105° C. by using an IR moisture determination mater FD-240-2 manufactured by Kett Electric Laboratory, until no weight fluctuation of the specimen occurred for 30 seconds.

The Kett water content is calculated by the following equation.

$$Kett \text{ water content } (\%) = \{(\text{the weight before drying}) - (\text{the weight after drying})\} / (\text{the weight before drying}) \times 100$$

Average particle diameter (710PASS), 710PASS ratio

A powder obtained by spray drying was sieved by a standard sieve with 710 μm meshes and the under sieve ratio was defined as 710PASS and the particle size of the under sieve products was measured by a dry sieving method described in JIS K-3362 and the average particle diameter on the basis of weight was defined as the average particle diameter (710PASS). It means that as the 710PASS ratio is higher, the productivity is higher.

(Dispersibility in Cold Water)

900 g of water was loaded to a 2 L-capacity beaker and 100 g of a sample was poured while stirring using 4 flat stirring blades in such a manner that the deepest part of the vortex reached the 500 mL scale on the beaker. The state of the sample was observed after 30 minutes and the oil droplet diameter was measured (by the light-scattering method by using LA-910 manufactured by Horiba Seisakusho Co., Ltd.).

(Bulking Density Improvement Ratio)

The bulking density improvement effect by the bulking agent A' for paper was measured by measuring the density of the under the following conditions.

$$\text{The bulking density improvement effect} = [(\text{density of sample-free product}) / (\text{density of sample-added product}) - 1] \times 100(\%).$$

Paper Manufacturing Method:

A pulp slurry containing 1% by weight of LBKP pulp slurry was weighed to adjust the basis weight of the sheet after paper manufacturing to be 80 g/m² and thereafter aluminum sulfate 0.5% by weight (to the pulp amount), Cato 302 as cationic starch (manufactured by Nippon N.S.C.) 0.3% by weight, Cyreen 94 as an alkyl ketene dimer sizing agent (manufactured by Kao Corporation) 0.2% by weight, Whiton PC as precipitated calcium carbonate (manufactured by Shiraishi Calcium Kaisha, Ltd.) 15% by weight were successively added in stirring condition, and the pulp concentration was diluted to be 0.5% by weight.

Each bulking agent for paper of the Examples or each bulking agent of the Comparative Examples was added as it was or after being diluted with water and added to the slurry at room temperature (20 to 25° C.) under stirring condition and as a yielding agent, Percol 47 (manufactured by Ciba Specialty Chemicals Inc.) 0.015% by weight was added.

The obtained each slurry was subjected to paper manufacturing by using a 150 mesh wire using a round type paper manufacturing apparatus to obtain a wet paper sheet. Each wet paper sheet was sandwiched on both surfaces by two sheets of No. 26 round type filtration paper sheets manufactured by Advantec and pressed at 3.5 kg/cm² for 5 minutes and dried at 105° C. for 2 minutes by a specular drier. Each dried sheet was subjected to moisture adjustment under the conditions of 23° C. and 50% RH for 1 day and then subjected to the measurement for the respective items shown in Table 1 and Table 2.

Density: The basis weight (g/m²) and the thickness (μm) of paper were measured to calculate the density (g/m³) according to the following formula: (basis weight/thickness). With respect to the density, as the absolute value is smaller, the bulk density is higher and the difference 0.02 of the density is regarded as a significant difference.

<Oil Spot Determination Method>

The existence of stains with oil droplets on paper was observed.

Comparative Example 21

A bulking agent for paper KB-115 (manufactured by Kao Corporation) was used as an oil chemical agent for paper manufacturing.

Comparative Example 22

Hot water 180 kg at 85° C. was loaded into a tank covered with a jacket in which hot water 90° C. was circulated and KB-115 20 kg was further loaded into the tank under stirring condition to dissolve it in water. After it was confirmed that KB-115 was dissolved and the solution temperature was increased to 80° C. or higher, the solution was subjected to circulation emulsification by a line mixer (for 1 hour). On completion of the emulsification, while the resulting emulsion was quenched to 50° C. or lower by being passed through a heat exchanger, the emulsion was sent to a storage tank. The average oil droplet diameter of the bulking agent was 5.3 μm.

Example 21

By using the respective components shown in Table 7, the paper manufacturing chemical agent particle was obtained by the following method, using 4 kg in total of 40% of the paper manufacturing chemical agent particle and 60% of water.

Water, Pinedex #2, cationic starch powder 1, and Emulster 30 were weighed and loaded into a 10 L-capacity container made of a metal and while the metal container was immersed in a hot water tank at 95° C., the mixture was mixed by a homomixer (RoboMix manufactured by Tokushu Kika Kogyo Co., Ltd.) until the solution temperature increased to 90° C. The resulting emulsion was kept at 90° C. or higher for 10 minutes to sufficiently gelatinize the Emulster 30.

After that, the temperature of the hot water tank was changed to be 85° C. and under a continuously stirring condition, the bulking agent A' for paper (melting point about 50° C.) was added and emulsification was carried out for 60 minutes. A portion of the obtained emulsion was added to water at a normal temperature under stirring condition and quenched to obtain a sample for the oil droplet diameter measurement (the oil droplet diameter was 4.2 μm).

While being kept at 70° C., the obtained emulsion was supplied at a speed of 100 g/min to a spray drying tower (SD-1 model, manufactured by Tokyo Rika Kikai Co., Ltd.) and finely granulated by a binary nozzle (compressed air was used as the dispersing gas). Hot air at 200° C. was supplied to a drying tower to dry the emulsion. The dried product was separated and recovered by a cyclone. As a result, a paper manufacturing chemical agent particle with an average particle diameter of about 50 μm was obtained. The results of respective measurement are shown in Table 1.

Example 22

By using the respective components shown in Table 7, the paper manufacturing chemical agent particle was obtained by the following method with 130 kg in total of 40% of the paper manufacturing chemical agent particle and 60% of water.

Water was loaded into a 300 L-capacity mixing tank covered with a jacket and Pinedex #2 and cationic starch powder 2 were added to the tank and hot water at 85° C. was supplied to the jacket to heat the solution to 75° C. or higher.

After that, a melted mixture of Sugar Ester S270 and a bulking agent A' (melting point about 50° C.) previously mixed at 70° C. or higher was added. After 30 minutes of stirring, the mixture was mixed by a line mixer (Pipeline Homomixer SL-2 model, manufactured by Tokushu Kika Kogyo Co., Ltd.) for circulation and emulsification at 6,600 rpm for 2 hours. A portion of the obtained emulsion was added to water at a normal temperature under a stirring condition and quenched to obtain a sample for oil droplet diameter measurement (the oil droplet diameter was 6.1 μm).

While being kept at 70° C. or higher, the obtained emulsion was supplied at a speed of 30 L/hr to a parallel flow type spray drying tower [the tower diameter 3.2 m, sprayer: RA-302MZ (rotor diameter 120 mm) manufactured by Ashizawa-Niroatomizer, Co., Ltd.] and dried at an atomizer rotation speed of 4,000 rpm and air blowing at 180° C. to obtain a dried powder from a discharge port of a lower part of the tower. As a result, a paper manufacturing chemical agent particle with an average particle diameter about 200 μm and water content about 2% was obtained. The respective measurement results are shown in Table 7.

According to the evaluation of dispersibility in cold water, KB 115, a solid at a room temperature, of Comparative Example 21 was not dispersed in water at a room temperature and floated in the form of agglomerates to make it impossible to obtain a chemical solution to be added to the paper manufacturing process. In order to obtain a chemical solution to be added to the paper manufacturing process, facilities for heating, dissolving, emulsifying and quenching were required.

On the other hand, the paper manufacturing chemical agent particles of the invention were all found having an oil droplet diameter of 50 μm or lower and good dispersibility in water, so that the particles could give chemical solutions and be easy to add in the paper manufacturing process. Since the paper manufacturing chemical agent particles of the invention were in a granular state, they have excellent storage properties.

According to the paper manufacturing evaluation, the paper manufacturing chemical agent particles of the invention were found having a bulk density improving effect as high as that of the agent of Comparative Example 22.

Comparative Example 23

A bulking agent (oil droplet diameter: average 5.3 μm) was obtained in the same manner as Comparative Example 22. The respective measurement results are shown in Table 8. In the paper manufacturing evaluation, the addition ratio type to pulp was different from that of Comparative Example 2.

Examples 23, 24

By using the respective components shown in Table 8, the paper manufacturing chemical agent particles were obtained by the following method with 230 kg in total of 40% of the paper manufacturing chemical agent particle and 60% of water.

Water was loaded into a 300 L-capacity mixing tank covered with a jacket and cationic polymers were added to the tank and hot water at 85° C. was supplied to the jacket to heat the solutions to 75° C. or higher.

TABLE 7

| | | Comparative example 21 | Comparative example 22 | Example 21 | Example 22 |
|---|---|---|---|---|---|
| Chemical agent particle for paper manufacturing | KB-115 | 100 | 100 | | |
| | Bulking agent A' | | | 52.6 | 50 |
| | cationic starch powder 1 | | | 3.2 | |
| | cationic starch powder 2 | | | | 3 |
| | Emulster 30 | | | 12.7 | |
| | Sugar Ester S270 | | | | 2 |
| | Pindex #2 | | | 31.5 | 45 |
| | Total (100% by mass) | 100 | 100 | 100 | 100 |
| | Oil droplet diameter (μm) | — | — | 4.2 | 6.1 |
| | Water content in emulsion (% by mass) | — | 90 | 60 | 60 |
| Dispersibity in cold water | Dispersion concentration (% by mass) | 10 | 10 | 10 | 10 |
| | dispersion state (eye observation) | Not dispersed | evenly opaque | evenly opaque | evenly opaque |
| | Oil droplet diameter (μm) | — | 5.3 | 18.2 | 34.9 |
| Paper manufacturing evaluation | actual addition ratio of agent (to pulp, %) | — | 0 / 0.3 / 0.5 / 1 | 0.5 / 1 / 1.0 / 1.0 | 1.0 / 2.0 |
| | Bulking dencity improvement ratio (%) | — | 0 / 2 / 3.8 / 6.1 | 4.2 / 7.1 / 5.6 / 5.8 | 6.0 / 7.3 |
| | Existence of oil spot | — | none / none / none / none | none / none / none / none | none / none |

Water content in emulsion (% by mass) means the water amount to the amount including the paper.

After hulking agent A' (melting point about 50° C.) was added and after 30 minutes of stirring, the mixtures were mixed by a line mixer (Pipeline Homomixer SL-2 model, manufactured by Tokushu Kika Kogyo Co., Ltd.) for circulation and emulsification at 6,600 rpm for 20 minutes. While the circulation and emulsification were continued further for one hour, Pinedex #2 was added and further the circulation and emulsification were continued to obtain emulsions. A portion of each obtained emulsion was added to water at a normal temperature under stirring conditions and quenched to obtain each sample for oil droplet diameter measurement (the oil droplet diameter was 2.0 μm for Example 23 and 2.3 μm for Example 24).

While being kept at 70° C., the obtained emulsion was supplied to a spray drying tower used in Example 3 and sprayed and dried with a spraying part of a sole nozzle, SSTX-3 manufactured by Spraying Systems Japan Co., Ltd., having an orifice diameter of 0.86 mm, at the spraying pressure of 1.8 MPa at the blowing temperature of 175° C. to obtain dry granules at the discharging outlet of the bottom of the column. Results are shown in Table 9.

The respective measurement results are shown in Table 8. The cross-sectional photograph (scanning type electron microscopic photograph) of the paper manufacturing chemical agent particle obtained in Example 24 is shown in FIG. 1.

TABLE 8

| | | Comparative example 23 | | | | Example 23 | | | | Example 24 | | | |
|---|---|---|---|---|---|---|---|---|---|---|---|---|---|
| Chemical agent particle for paper manufacturing | KB-115 | 100 | | | | | | | | | | | |
| | Bulking agent A' | | | | | 50.0 | | | | 70.0 | | | |
| | cationic polymer | | | | | 1.3 | | | | 1.8 | | | |
| | Pinedex #2 | | | | | 48.7 | | | | 28.2 | | | |
| | Total (100% by mass) | 100 | | | | 100.0 | | | | 100.0 | | | |
| | Water content in emulsion(% by mass) | 90 | | | | 60 | | | | 60 | | | |
| Phisical properties of paper manufacturing chemical agent | Recovery ratio (%) | | | | | 88 | | | | 96 | | | |
| | Kett water (%) | | | | | 2.4 | | | | 1.8 | | | |
| | average particle diameter (710PASS)(μm) | | | | | 185 | | | | 177 | | | |
| | 710PASS ratio (%) | | | | | 97.6 | | | | 97.2 | | | |
| | Oil droplet diameter (μm) | | | | | 2.0 | | | | 2.3 | | | |
| Dispersibity in cold water | dispersion concentration (% by mass) | 10 | | | | 10 | | | | 10 | | | |
| | dispersion state (eye observation) | evenly opaque | | | | evenly opaque | | | | evenly opaque | | | |
| | Oil droplet diameter (μm) | 5.3 | | | | 2.3 | | | | 2.6 | | | |
| Paper manufacturing evaluation | actual addition ratio of agent (to pulp, %) | 0 | 0.3 | 0.5 | 1 | 0 | 0.3 | 0.5 | 1 | 0 | 0.3 | 0.5 | 1 |
| | bulk dencity improvement ratio (%) | 0.0 | 1.3 | 4.5 | 7.6 | 0.0 | 1.6 | 3.4 | 6.9 | 0.0 | 2.8 | 6.0 | 8.4 |
| | existence of oil spot | none | none | none | none | none | none | none | none | none | none | none | none |

The water content in emulsion (% by mass) means the water amount to the amount including the paper While being kept at 70° C. or higher, each emulsion was supplied at a speed of 30 L/hr to a parallel flow type spray drying tower [the tower diameter 3.2 m, sprayer: RA-302MZ (rotor diameter 120 mm) manufactured by Ashizawa-Niroatomizer, Co., Ltd.] and dried at an atomizer rotation speed of 4,000 rpm and air blowing at 180° C. to obtain a dried powder from a discharge port of a lower part of the tower. As a result, paper manufacturing chemical agent particles both with an average particle diameter about 200 μm and water content about 2% were obtained.

By using the respective components shown in Table 9, the paper manufacturing chemical agent particles was obtained by the following method, using 200 kg in total of 50% of the paper manufacturing chemical agent particle and 50% of water.

Water was loaded into a 300 L-capacity mixing tank covered with a jacket. Cation polymer was added to the tank while stirred and then Pinedex #2 was added thereto. Hot water at 85° C. was supplied to the jacket to heat the solution to 75° C. or higher.

Bulking agent A (melting point about 50° C.) was introduced and optionally phosphoric acid was added. The mixture was stirred for 30 minutes. It was then passed through a stationary dispersing device, Bunsankun manufactured by Fujikin Co., Ltd., at such a flow rate as to produce a pressure loss of 0.9 MPa at the dispersing device and recycled and emulsified for about one hour to obtain an emulsion. Part of the obtained emulsion was poured into water at room temperature, while stirred, to be cooled rapidly and obtain a sample for determination of oil drop's diameter.

Since cationic polymers were used for the emulsifying substances in the paper manufacturing chemical agent particles of Examples 23 and 24, the oil droplet diameter of the emulsions and that of the dispersions were almost the same and as a result, it was supposed that in the paper manufacturing chemical agent particles, the oil chemical agents for paper manufacturing were well dispersed and fixed.

The paper manufacturing chemical agent particles of Examples 24 were found having improved bulk density improving effect as compared with that of the particle of Comparative Example 23 and it was supposedly attributed to the fact that cationic polymers with a high cation density were used as the emulsifying agents and accordingly the fixation efficiency on pulp was improved.

From the SEM photograph of FIG. 1, the paper manufacturing chemical agent particle had hollow parts in the center parts and the remaining portions of the cross-section were found having a dense structure having fine voids. The particle having such hollow parts is preferable since it has an improved collapsing property when it is dispersed in water and thus has improved dispersibility in water.

It is noted from Example 25, 26, 27 and 28 that the capsulation state, such as a difference between the diameter of oil drops in the emulsion and that of oil drops re-dispersed from powder, changes depending on the kind of the cation polymer as the emulsifier. This means importance of the cation polymer. It is noted from Example 26 and 27 that the capsulation state changes with an adjusted pH value of the emulsion even with the same cation polymer. The difference between the diameter of oil drops in the emulsion and that of oil drops re-dispersed from powder is considered to indicate how oil drops in the emulsion associate with each other in the production of the paper manufacturing chemical agent particle. The smaller the difference is, the more enhanced and preferable the capsulation is.

TABLE 9

| | | Example 25 | Example 26 | Example 27 | Example 28 |
|---|---|---|---|---|---|
| Chemical agent particle for paper manufacturing | KB-115 | | | | |
| | Bulking agent A'[%] | 70.0 | 70.0 | 70.0 | 70.0 |
| | cationic polymer [%] | 1.8 | | | |
| | cationic polymer 2 [%] | | 1.8 | 1.8 | |
| | cationic polymer 3 [%] | | | | 1.8 |
| | H3PO4 [%] | | | 0.04 | 0.04 |
| | Pinedex #2 [%] | 28.2 | 28.2 | 28.2 | 28.2 |
| | Total (100% by mass)[%] | 100 | 100 | 100 | 100 |
| Emulsion | Water content in emulsion(% by mass)[%] | 50 | 50 | 50 | 50 |
| | Oil drop diameter in emulsion[μm] | 1.0 | 1.0 | 1.1 | 1.1 |
| | pH of liquid of solid content 10% | 5.4 | 5.5 | 3.6 | 3.6 |
| Phisical properties of paper manufacturing chemical agent | Kett water (%) | 1.2 | 1.0 | 1.1 | 0.7 |
| | average particle diameter (710PASS)(μm) | 117 | 110 | 113 | 116 |
| | 710PASS ratio (%) | 100 | 100 | 100 | 100 |
| Dispersibity in cold water | dispersion concentration (% by mass) | 10 | 10 | 10 | 10 |
| | dispersion state (eye observation) | evenly opaque | evenly opaque | evenly opaque | evenly opaque |
| | Oil droplet diameter (μm) | 1.2 | 5.0 | 3.6 | 2.3 |
| Paper manufacturing evaluation | actual addition ratio of agent (to pulp, %) | 1.0 | 1.0 | 1.0 | 1 |
| | bulk dencity improvement ratio (%) | 6.9 | 5.8 | 5.5 | 6.8 |
| | existence of oil spot | None | None | None | None |

The invention claimed is:

1. A method of producing a pulp sheet, comprising adding a powder composition directly to a pulp slurry or adding a dispersion of the powder composition in water to the pulp slurry, the powder composition comprising a hydrophobic organic compound (A) to be used as a paper manufacturing agent, an emulsifying and dispersing agent (B), and a water-soluble saccharide (C), wherein the powder composition has an average particle diameter of 10 to 700 μm, and wherein the hydrophobic organic compound (A) is at least one compound selected from the group consisting of the following groups (i) to (viii), and mixtures thereof:
(i) organopolysiloxane compounds;
(ii) amine compounds;
(iii) amine acid salt compounds;
(iv) quaternary ammonium compounds;
(v) imidazole compounds;
(vi) hydrocarbon compounds;
(vii) alcohol compounds; and
(viii) at least one compound having a carbonyl group and an alkyl group in a molecule and selected from the group consisting of the following groups (viii-a) to (viii-d), and mixtures thereof:
(viii-a) aliphatic acids or their addition products of alkylene oxide having 2 to 4 carbon atoms;
(viii-b) esters of aliphatic acids and alcohols or their addition products of alkylene oxide having 2 to 4 carbon atoms;
(viii-c) aliphatic acid amides or their addition products of alkylene oxide having 2 to 4 carbon atoms; and
(viii-d) aliphatic acid amideamines or their addition products of alkylene oxide having 2 to 4 carbon atoms;
wherein the water-soluble saccharide (C) is selected from the group consisting of dextrin, maltodextrin, cyclodextrin, and octenylsuccinic acid starch;
wherein the hydrophobic organic compound (A) and the emulsifying and dispersing agent (B) are evenly dispersed and enclosed within the water-soluble saccharide (C); and
wherein the emulsifying and dispersing agent (B) is a copolymer comprising composing units derived from at least one kind of non-ionic monomer having a dissolution parameter of 20.5 $(MPa)^{1/2}$ or lower and at least one kind of cationic monomer.

2. The method according to claim 1, wherein the hydrophobic organic compound (A) is a bulking agent.

3. The method according to claim 1, wherein the content of the hydrophobic organic compound (A) is limited to 50 to 99.99% by weight of the powder composition.

4. The method according to claim 1, wherein the ratio of [(A)+(B)/(C)] is limited to (95/5) to (50/50).

5. The method according to claim 1, wherein the hydrophobic organic compound (A) is (viii-b).

6. The method according to claim 1, wherein the nonionic monomer with a dissolution parameter of 20.5 $(MPa)^{1/2}$ or lower is an unsaturated monomer selected from the group consisting of (meth)acrylic acid esters with an alkyl having 1 to 40 carbon atoms, fatty acid esters with an alkenyl having 1 to 40 carbon atoms, (meth)acrylamide modified with an alkyl having 2 to 40 carbon atoms, (meth)acrylamide modified with an alkoxy group having 2 to 40 carbon atoms, maleic acid ester with a mono- or di-alkyl having 1 to 40 carbon atoms, fumalic acid ester with a mono- or di-alkyl having 1 to 40 carbon atoms, styrene, vinyltoluene, α-methylstyrene, ethylene, propylene, butadiene, polyalkylene glycol (meth)acrylate, alkoxypolyalkylene glycol (meth)acrylate, polyalkylene glycol alkenyl ether and alkoxypolyalkylene glycol alkenyl ether.

7. The method according to claim 1, wherein the cationic monomer is an unsaturated monomer selected from the group consisting of dimethylaminoethyl (meth)acrylate, diethylaminoethyl (meth)acrylate, dimethylaminopropyl (meth)

acrylamide, diethylaminopropyl (meth)acrylamide, allylamine, diallylamine, and triallylamine.

8. The method according to claim 1, wherein the amount of the nonionic monomer is 0.5 to 50% by mole of the total monomers.

9. The method according to claim 1, wherein the amount of the cationic monomer is 50 to 99.5% by mole of the total monomers.

* * * * *